(12) United States Patent
Gentry

(10) Patent No.: US 7,657,748 B2
(45) Date of Patent: Feb. 2, 2010

(54) CERTIFICATE-BASED ENCRYPTION AND PUBLIC KEY INFRASTRUCTURE

(75) Inventor: Craig B. Gentry, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 868 days.

(21) Appl. No.: 10/521,741

(22) PCT Filed: Aug. 28, 2003

(86) PCT No.: PCT/US03/26834

§ 371 (c)(1),
(2), (4) Date: Jan. 18, 2005

(87) PCT Pub. No.: WO2004/021638

PCT Pub. Date: Mar. 11, 2004

(65) Prior Publication Data

US 2005/0246533 A1 Nov. 3, 2005

Related U.S. Application Data

(60) Provisional application No. 60/406,721, filed on Aug. 28, 2002, provisional application No. 60/412,221, filed on Sep. 20, 2002.

(51) Int. Cl.
*H04L 9/30* (2006.01)
(52) U.S. Cl. .................... 713/170; 713/180; 380/286
(58) Field of Classification Search .............. 380/28, 380/30, 286; 713/170, 173, 176
See application file for complete search history.

(56) References Cited

U.S. PATENT DOCUMENTS

| 4,309,569 | A | | 1/1982 | Merkle |
| 5,432,852 | A | | 7/1995 | Leighton et al. |
| 5,590,197 | A | | 12/1996 | Chen et al. |
| 5,764,772 | A | * | 6/1998 | Kaufman et al. .............. 380/30 |
| 5,774,552 | A | | 6/1998 | Grimmer |
| 5,867,578 | A | | 2/1999 | Brickell et al. |
| 6,141,420 | A | | 10/2000 | Vanstone et al. |
| 6,212,637 | B1 | | 4/2001 | Ohta et al. |
| 6,618,483 | B1 | | 9/2003 | Vanstone et al. |
| 6,760,441 | B1 | | 7/2004 | Ellison et al. |
| 6,826,687 | B1 | | 11/2004 | Rohatgi |
| 6,886,296 | B1 | | 5/2005 | John et al. |
| 7,088,822 | B2 | | 8/2006 | Asano |

(Continued)

FOREIGN PATENT DOCUMENTS

EP    1 051 036 A2    8/2000

OTHER PUBLICATIONS

Dutta, Ratna et al. "Pairing-Based Cryptographic Protocols: A Survey" Cryptographic Research Group. 2004.

(Continued)

*Primary Examiner*—Gilberto Barron, Jr.
*Assistant Examiner*—Hadi Armouche
(74) *Attorney, Agent, or Firm*—Haynes and Boone, LLP

(57) ABSTRACT

A digital message is sent from a sender to a recipient in a public-key based cryptosystem comprising an authorizer. The authorizer can be a single entity or comprise a hierarchical or distributed entity. In some embodiments, no key status queries or key escrow are needed. The recipient can decrypt the message only if the recipient possesses up-to-date authority from the authorizer. Other features are also provided.

100 Claims, 12 Drawing Sheets

U.S. PATENT DOCUMENTS

| | | | |
|---|---|---|---|
| 7,113,594 | B2 | 9/2006 | Boneh et al. |
| 7,178,025 | B2 | 2/2007 | Scheidt et al. |
| 7,216,230 | B2 * | 5/2007 | Suzuki et al. ............... 713/170 |
| 7,224,804 | B2 | 5/2007 | Ishiguro et al. |
| 7,225,339 | B2 | 5/2007 | Asano et al. |
| 7,580,988 | B2 | 8/2009 | Rudd |
| 2002/0025034 | A1 | 2/2002 | Solinas |
| 2002/0154782 | A1 | 10/2002 | Chow et al. |
| 2003/0081785 | A1 | 5/2003 | Boneh et al. |
| 2003/0095665 | A1 | 5/2003 | Wheeler et al. |
| 2003/0097562 | A1 | 5/2003 | Wheeler et al. |
| 2003/0097569 | A1 | 5/2003 | Wheeler et al. |
| 2003/0179885 | A1 | 9/2003 | Gentry et al. |
| 2003/0182554 | A1 | 9/2003 | Gentry et al. |
| 2005/0022102 | A1 | 1/2005 | Gentry et al. |
| 2005/0169464 | A1 | 8/2005 | Sannino et al. |
| 2005/0246533 | A1 | 11/2005 | Gentry et al. |
| 2006/0126832 | A1 | 6/2006 | Takahashi |
| 2007/0189539 | A1 | 8/2007 | Kim et al. |

OTHER PUBLICATIONS

Gentry, Craig and Silverberg, Alice: "Hierarchical ID-Based Cryptography," May 24, 2002, pp. 1-21, XP002396667.

N. Koblitz, *Elliptic Curve Cryptosystems*, Mathematics of Computation, vol. 48, No. 177, Jan. 1987, pp. 203-209.

Y. Dodis, M. Yung, *Exposure-Resilience for Free: The Hierarchical ID-Based Encryption Case*.

U. Feige, A. Fiat, A. Shamir, *Zero Knowledge Proofs of Identity*, 1987 ACM 0-89791-22 7/87/0006-0210, pp. 210-217.

S. S. Al-Riyami, K. G. Paterson, *Authenticated Three Party Key Agreement Protocols From Pairings*, 2002.

C. G. Gunther, A. B. Boveri, *An Identity-Based Key-Exchange Protocol*, pp. 29-37.

A. Fiat, A. Shamir, *How to Prove Yourself: Practical Solutions to Identification and Signature Problems*, 1998, pp. 186-194.

J.C. Cha and J.H. Cheon, *An Identity-Based Signature from Gap Diffie-Hellman Groups*, Cryptology ePrint archive, Report 2002/018, 2002. http://eprint.iacr.org/.

N. P. Smart, *An Identity-Based Authenticated Key Agreement Protocol Based on the Weil Pairing*, Cryptology Eprint Archive, Report 2001/111,2001. http://eprint.iacr.org/.

D. Boneh, M. Franklin, *Identity-Based Encryption from the Weil Pairing*, Advances in Cryptology—Crypto2001, Springer LNCS 2139.

C. Cocks, *An Identity Based Encryption Scheme Based On Quadratic Equations*.

J. Horwitz, B. Lynn, *Toward Hierarchical Identity-Based Encryption*.

M. Girault, *Self-Certified Public Keys*, 1998, pp. 490-497.

L.C. Guillou, J. Quisquater, *A Practical Zero-Knowledge Protocol Fitted to Security Microprocessor Minimizing Both Transmission and Memory*, Advances in Cryptology—Eurocrypt'88, Lect. Notes in Computer Science, vol. 330, pp. 123-128, Springer Verlag (1988).

R. Blom, *An Optimal Class of Symmetric Key Generation Systems*, 1998, pp. 336-338.

C. Blundo, A. De Santis, A. Herzberg, S. Kutten, U. Vaccaro, M. Yung, *Perfectly-Secure Key Distribution for Dynamic Conferences*, 1998, Springer-Verlag, pp. 471-486.

F. Hess, *Exponent Group Signature Schemes and Efficient Identity Based Signature Schemes based on Pairings*, Cryptology Eprint Archive, Report 2002/012, 2002. http://eprrint.iacr.org/.

K. Rubin, A. Silverberg, *Supersingular Abelian Varieties in Cryptology*.

W. Diffie, M. E. Hellman, *New Directions in Cryptography*, pp. 29-40.

A. Menezes, P. van Oorschot, S. Vanstone, *Chapter 12 Key Establishment Protocols*, Handbook of Applied Cryptography, 1997, pp. 489-541.

V.S. Miller, *Use of Elliptic Curves in Cryptography*, 1998, pp. 417-426.

D. Boneh, B. Lynn, H. Shacham, *Short Signatures from the Weil Pairing*, Advances in Cryptology: Asiacrypt 2001 (LNCS 2248), pp. 514-532, 2001.

E. Fujisaki, T. Okamoto,*Secure Integration of Asymmetric and Symmetric Encryption Schemes*, Michael Wiener (Ed.): Cryptpto'99, LNCS 1666, pp. 537-554, 1999.

A. Shamir, *Identity-Based Cryptosystems and Signature Schemes*, 1998, Springer-Verlag, pp. 46-53.

U. Maurer, Y. Yacobi, *A Remark on a Non-Interactive Public-Key Distribution System*, 1998.

G. Hanaoka, T. Nishioka, Y. Zheng, H. Imai, *A Hierarchical Non-interactive Key-Sharing Scheme with Low Memory Size and High Resistance Against Collusion Attacks*, The Computer Journal, vol. 45, No. 3, 2002.

G. Hanaoka, T. Nishioka, Y. Zheng, H. Imai, *An Efficient Hierarchical Identity-Based Key-Sharing Method Resistant Against Collusion-Attacks*, JSPS-REFT 96P00604, pp. 348-362.

A. Joux, A One Round Protocol for Tripartite Diffie-Hellman, W. Bosma (Ed.), ANTS-IV, LNCS 1838, pp. 385-393, 2000.

Sakai, Ryuichi et al., "Cryptosystems Based on Pairing", The 2000 Symposium on Cryptography and Information Security, Okinawa, Japan, Jan. 26-28, 2000, SCIS2000-C20.

Sakai, Ryuichi et al., "Cryptosystems Based on Pairing over Elliptic Curve", The 2001 Symposium on Cryptography and Information Security, Oiso, Japan, Jan. 23-26, 2001, The Institute of Electronics, Information and Communication Engineers.

Sakai, Ryuichi et al., "Crypt schemes based on Weil Pairing," pp. 1-12.

Okamato, "A Digital Multisignature Scheme Using Bijective Public Key Cryptosystems," ACM Transactions on Computer Systems, Vo. 6, No. 8, Nov. 1992, pp. 432-441.

Boyd, "Multisignatures Based on Zero Knowledge Schemes", Electronic Letters, Oct. 1991, Fol. 27, No. 22, pp. 1-3.

Silverberg et al., U.S. Appl. No. 60/366,196 filed on Mar. 21, 2002, 18 pages.

\* cited by examiner

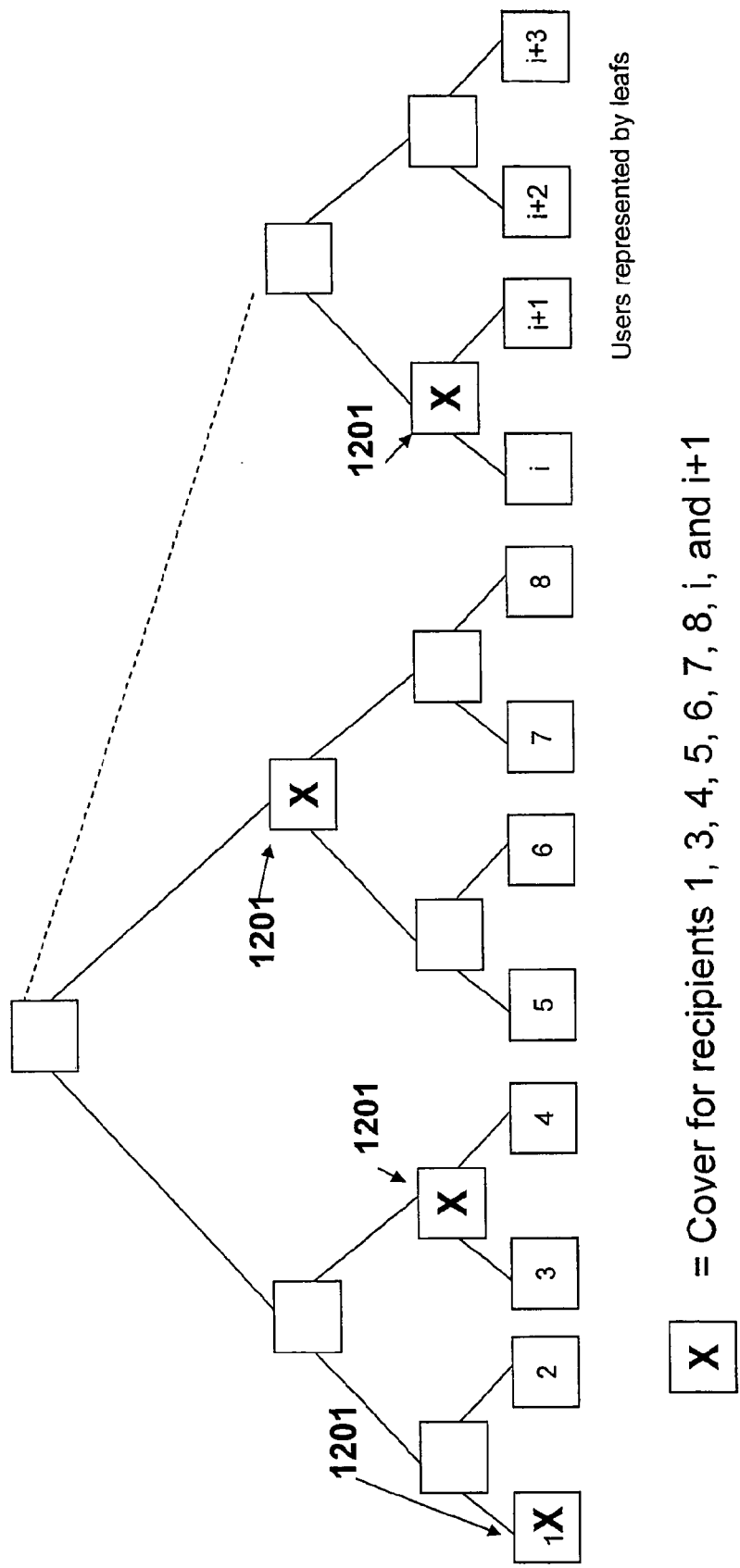

ered in a certificate. Thus, even parties that have never met can communicate securely. Key escrow is inherent in identity-based systems since the trusted third party knows every user's private key. Thus, there is no need for a PKI, certificate queries, or key revocation. Encryption is non-interactive since the encrypter does not need to acquire the recipient's public-key certificate. This reduces the burden on the public-key infrastructure.

CERTIFICATE-BASED ENCRYPTION AND PUBLIC KEY INFRASTRUCTURE

RELATED APPLICATIONS

This application claims the benefit of U.S. provisional patent applications Ser. No. 60/406,721, filed Aug. 28, 2002, and 60/412,221, filed Sep. 20, 2002, the entire contents of which are fully incorporated herein by this reference.

This application is a National Stage application of PCT/US2003/026834 filed Aug. 28, 2003.

BACKGROUND OF THE INVENTION

The present invention relates in general to cryptography and secure communication via computer networks or via other types of systems and devices, and more particularly to an improved method of implementation of public-key cryptography.

A user of a public-key cryptography based communication system communicates with another user by means of two different keys, a public key and a private key. A user's public key and private key form a public key/private key pair. A message sender communicates securely with a message recipient by encrypting a message using the recipient's public key. The sender then sends the message to the recipient who decrypts the message using the recipient's private key.

The security of messages sent to a user of a public-key based cryptography system depends on the security of the user's private key. Although the user's public key is freely available to other users, the user keeps its private key secret and known only to those privileged to receive messages sent to the user.

The implementation of public key cryptography requires an "infrastructure" to manage requirements such as key distribution and to certify for key validity. Before encrypting a message to a recipient, a message sender must have access to the recipient's public key. The sender must also confirm that this key is valid and not compromised.

In public-key cryptography systems, a trusted third party—the "certification authority" (CA) may perform functions such as key distribution and certification. Typically, the CA issues a "certificate" for each of its client users together with the CA's electronic signature to confirm the validity of the certificate. The certificate securely binds together several quantities. Usually, the certificate includes parameters such as the name of the client and the client's public key. Parameters such as the certificate's issue date and expiration date also may be included. By issuing a client's certificate, the CA attests that the associated public key is authentic and corresponds to the particular user for the validity period of the certificate.

Circumstances may require the revocation of a client's certificate before its intended expiration date. For example, revocation may be necessary if another party compromises the client's private key. Alternatively, the client may no longer be entitled to use the public key. If a certificate is revocable, then other users cannot rely on that certificate unless the CA distributes certification status information indicating that a certificate is currently valid. Such information must be up to date and distributed to all relying parties. Distributing such large amounts of information requires significant resources on the part of the CA and is a barrier to the widespread implementation of public-key cryptography.

The most well known—but inefficient—public-key infrastructure (PKI) proposal to address the key revocation issue is a certification revocation list (CRL). A CRL is a list of certificates revoked before their intended expiration date. The CA issues this list periodically together with its signature to confirm the validity of the CRL. Since the CA may revoke many certificates before their intended expiration date, the CRL may become very long, particularly if the CA has many clients. Each party requesting a certificate status check receives this list. Refinements to this approach require transmission of only those certificates revoked since the CA's last update. However, the transmission and infrastructure costs are still high.

An alternative proposal is the Online Certificate Status Protocol (OCSP). In this protocol, any user can query the CA as to the status of any client of the CA, including the validity of the client's public key. The CA responds to each query by generating a fresh signature on the certificate's current status. This proposal reduces transmission costs to a single signature per query. However, computation costs increase because a fresh signature is required in response to every query. Security also decreases because, if the CA is centralized, it becomes more vulnerable to denial-of-service (DoS) attacks.

A more promising protocol is the Micali "Novomodo" system. (S. Micali, Efficient Certificate Revocation, Proceedings of RSA Data Security Conference 1997; S. Micali, Novomodo: Scalable Certificate Validation and Simplified PKI Management, PKI Research Workshop, 2002.) The Novomodo system involves a CA, one or more directories to distribute certificate information, and the users. However, it achieves better efficiency than CRLs and OCSP, without sacrifices in security. The advantage of Novomodo over a CRL-based system is that a directory's response to a certificate status query is concise compared to a CRL protocol whereas the length of a CRL grows with the number of certificates revoked. Novomodo has several advantages over OCSP. First, the CA's computational load is much lower. Second, unlike the distributed components of an OCSP, the directories in Novomodo need not be trusted. Third, Novomodo is less susceptible to DoS attacks. Finally, although the directory-to-user communication costs of OCSP are low, Novomodo's are typically even lower. However, Novomodo still requires certification status queries.

Many refinements to protocols involving certificate status queries attempt to reduce PKI computation and transmission requirements and offer a variety of tradeoffs. However, there are several reasons for eliminating, or at least reducing, certificate status inquiries. First, such inquiries may come from any user and concern any client. Hence, every CA server in the system must be able to determine the certificate status for every client of the CA. Second, certificate status queries from the client multiply the query processing costs of the CA. If each of N clients queries the status of 10 other clients each day, the CA must process 10N queries. Third, nonclient queries are undesirable from a business model perspective. It is unclear, economically, how the CA should handle queries from non-clients. Finally, as mentioned above, if the CA must respond to queries from non-clients, it becomes more susceptible to DoS attacks.

Identity-based cryptosystems eliminate third-party queries. Identity-based cryptosystems are public key cryptosystems in which the public key of a user derives from the user's identity (name, address, email address, IP address, etc.). A trusted third party generates a user's private key using the user's identity and a master secret held by the trusted third party. In such a system, a first user can encrypt a message to the second user without obtaining explicit information other than the second user's identifying information and parameters of the second user's CA. The second user can decrypt the message only if that user has received an updated private key from its CA.

The concept of an identity-based cryptosystem was proposed in A. Shamir, *Identity-Based Cryptosystems and Signatures Schemes*, ADVANCES IN CRYPTOGRAPHY—CRYPTO '84, Lecture Notes in Computer Science 196 (1984), Springer, 47-53. However, practical identity-based encryption schemes have not been found until recently. For instance, identity-based schemes were proposed in C. Cocks, *An Identity-Based Encryption Scheme Based on Quadratic Residues*, available at h-t-t-p://www.cesqg.gov.uk/technology/id-pkc/media/ciren.pdf; D. Boneh, M. Franklin, *Identity Based Encryption from the Weil Pairing*, ADVANCES IN CRYPTOLOGY—CRYPTO 2001, Lecture Notes in Computer Science 2139 (2001), Springer, 2 13-229; and D. Boneh, M. Franklin, *Identity Based Encryption from the Weil Pairing* (extended version), available at h-t-t-p://www.cs.stanford.edu/~dabo/papers/ibe.pdf. Cocks' scheme is based on the "Quadratic Residuosity Problem," and although encryption and decryption are reasonably fast (about the speed of RSA), there is significant message expansion (i.e., the bit-length of the ciphertext is many times the bit-length of the plaintext). The Boneh-Franklin scheme bases its security on the "Bilinear Diffie-Hellman Problem," and it is quite fast and efficient when using Weil or Tate pairings on supersingular elliptic curves or abelian varieties.

Existing identity-based cryptosystems, however, have had only limited acceptance. One major reason for this is that these systems involve key escrow. The CA knows all secrets in the cryptosystem because it generates the private keys of all users. As a result, existing identity-based cryptosystems have been vulnerable to passive attacks in which the CA, or any other party that discovers the master secret can determine shared secret of the two users.

There is a need for an efficient scheme allowing a recipient user of a cryptosystem to decrypt a secret message from a message sender only when a trusted third party certifies that the recipient holds a valid private key. Ideally, such a scheme should not require that the message sender query another party, including the third party, as to the status of the recipient's private key. Neither should such a scheme have the disadvantage of third party key escrow.

It therefore is an object of the present invention to provide an efficient protocol, not involving key status queries or key escrow, wherein a message recipient can decrypt a message from a message sender only if the recipient obtains authorization (e.g. up to date certification) from a third party. It is a further object of the present invention to provide such a protocol wherein the recipient's decryption ability is contingent upon authorization by several parties. Another object of the present invention is to provide such a protocol wherein the third party comprises a hierarchical authorization entity within the cryptosystem. It is yet another object of the present invention to provide an efficient method of providing a user with a private key having a short validity period. It is a further object of the invention to provide such a protocol that allows such communication in a system comprising a large number (e.g. millions) of users.

BRIEF SUMMARY OF THE PREFERRED EMBODIMENTS

The present invention provides methods for implementing a secure and practical certificate-based encryption scheme.

According to one aspect of the present invention, the method provides for encoding and decoding a digital message between a sender and a recipient in a public-key encryption scheme including the sender, the recipient and an authorizer. The method includes the steps of generating a recipient public key/recipient private key pair and a recipient encryption key. A key generation secret that is a secret of the authorizer is selected. A recipient decryption key is generated using at least the key generation secret and the recipient encryption key where a key formed from the recipient decryption key and a key formed from the recipient encryption key are a public key/private key pair.

The digital message is encrypted using at least the recipient public key and the recipient encryption key to create an encrypted digital message. The encrypted digital message is decrypted using at least the recipient private key and the recipient decryption key.

Another aspect of the present invention provides a method for sending a digital message between a sender and a recipient in a public-key encryption system including a plurality of authorizers, the plurality of authorizers including at least a root authorizer and a lower-level authorizer in a hierarchy between the root authorizer and the recipient. The method includes the steps of generating a recipient public key/private key pair and a recipient encryption key, where the recipient encryption key is generated using identity information of at least one of the recipient's ancestors.

A root key generation secret is selected and a root key generation parameter generated based on the root key generation secret. A recipient decryption key is then generated such that the recipient decryption key is related to the recipient encryption key, the root key generation secret and the associated root key generation parameter.

The digital message is encrypted using the recipient public key and a recipient encryption key to create an encrypted digital message, where a key formed from the recipient decryption key and a key formed from the recipient encryption key are a public key/private key pair. The encrypted digital message is decrypted using at least the recipient private key and the recipient decryption key.

Another aspect of the present invention provides a method of generating a decryption key for an entity in an encryption system including a plurality of authorizers, the plurality of authorizers including at least a root authorizer and lower-level authorizers in the hierarchy between the root authorizer and the entity. The method included the steps of generating a root key generation secret and a root key generation parameter based on the root key generation secret. A lower-level key generation secret for the lower-level authorizers is generated. A lower-level key generation parameter for lower-level authorizers is then generated using at least the lower-level key generation secret for its associated lower-level authorizer.

A decryption key generation schedule is established defining a validity period for a decryption key for the entity. The decryption key for the entity is generated such that the decryption key is related to at least the root key generation secret and one or more of the lower-level key generation secrets.

Another aspect of the present invention provides a method of sending a digital message between a sender and a recipient in a public-key encryption scheme including the sender, the recipient and a plurality of authorizers, where the recipient can decrypt the digital message only if it possesses authorization from the authorizers. The method includes the steps of generating a recipient public key/private key pair for the recipient and a secret key for each of the authorizers. A public key is generated for each of the authorizers using at least the secret key for its associated authorizer. A string of binary digits is signed with the secret key to generate a signature for each of the authorizers.

The digital message is encrypted to form a ciphertext using at least the recipient's public key, the public keys of the authorizers, and the strings of binary digits signed by the authorizers. The encrypted digital message is decrypted using at least the recipient's private key, and the signatures generated by the authorizers.

Another aspect of the present invention provides a method of sending a digital message between a sender and a recipient in a public key encryption scheme comprising the sender, the recipient and a plurality of authorizers including at least a root authorizer and lower-level authorizers in the hierarchy between the root authorizer and the recipient, where the recipient can decode the digital message only if it possesses authorization from the authorizers. The method includes the steps of generating a recipient public key/private key pair for the recipient and a secret key for the root authorizer and each of the lower level authorizers. A public key is generated for the root authorizer and each of the lower level authorizers using at least the secret key for the associated authorizer.

Documents, each containing the public key of each of the lower level authorizers, are certified to generate a signature, where the document containing the public key of each lower level authorizer is certified by the authorizer above it in the hierarchy. A document comprising the recipient public key and a parameter determining the validity of the recipient public key is certified by the authorizer immediately above the recipient in the hierarchy.

The digital message is encrypted to form a ciphertext using at least the recipient's public key, the public keys of the authorizers, and the documents. The encrypted digital message is decrypted using at least the recipient's private key and the signatures generated by the authorizers.

Another aspect of the present invention provides a method of encrypting and decrypting a digital message between a sender and a recipient in a public-key encryption scheme including the sender, the recipient and an authorizer. The method includes the steps of generating a recipient public key/recipient private key pair and selecting a key generation secret known to the authorizer. A recipient decryption key associated with time period i is generated, where this key is related to the key generation secret and where recipient decryption keys associated with time periods earlier than i, but not those associated with time periods later than i, can be generated from the recipient decryption key associated with time period i.

The digital message is encrypted to form a ciphertext using the recipient public key, the time period parameter associated with time period i or a time period parameter associated with an earlier time period, and a recipient encryption key to create an encoded digital message. The encrypted digital message is decrypted using at least the recipient private key and the recipient decryption key associated with time period i.

Another aspect of the present invention provides a method of sending a digital message between a sender and a recipient in a public-key encryption scheme including the sender, a plurality of clients including the recipient, and an authorizer, where the digital message is encrypted by the sender and decrypted by the recipient when the recipient is authorized to do so by the authorizer. The method includes the steps of generating a recipient public key/recipient private key pair and a unique binary string associating the recipient with a leaf node in a B-tree. A unique binary string associated with each ancestor node of the recipient leaf node and an encryption key for the recipient leaf node and for each of the ancestor nodes for the recipient leaf node are also generated, as is a master secret known to the authorizer. The encryption key for each node is associated with at least the binary string associated with that node.

A recipient decryption key associated with an ancestor node of the recipient leaf node is generated, where the ancestor node is not an ancestor of a leaf node associated with a client not authorized by the authorizer. The recipient decryption key is associated with at least the binary string associated with that node and the master secret. The recipient decryption key associated with an ancestor node of the recipient leaf node forms a private key/public key pair with the encryption key associated with the ancestor node of the recipient leaf node.

The sender encrypts the digital message to create an encrypted digital message using at least the recipient public key, and the encryption keys associated with the recipient leaf node and ancestor nodes of the recipient leaf node. The recipient decrypts the encrypted digital message using at least the recipient private key and the recipient decryption key associated with an ancestor node of the recipient leaf node.

BRIEF DESCRIPTION OF THE DRAWINGS

The subsequent description of the preferred embodiments of the present invention refers to the attached drawings, wherein:

FIG. 12 shows a block diagram illustrating broadcast encryption scheme using the cover concept.

DESCRIPTION OF THE EMBODIMENTS

Figure 1:
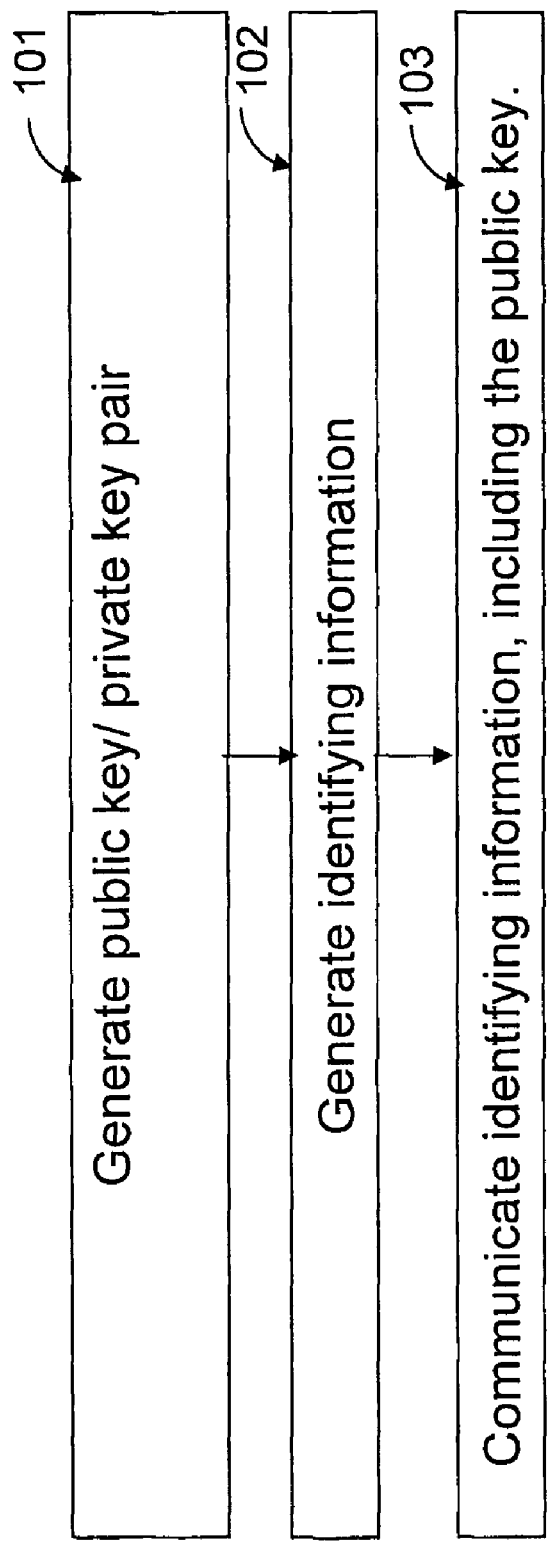
FIG. 1 shows a flow diagram illustrating the steps performed by a message recipient according to one embodiment of the invention.

The methods of the invention provide efficient protocols allowing a sender in a cryptosystem to communicate a secret message to a recipient only when a trusted third party (the "authorizer") certifies that the recipient should receive the message.

In the protocols described below, the names "sender" and "recipient" represent two users of a cryptosystem. Such a cryptosystem may include many users other than the sender and recipient. Specifically, the sender represents a first user who wishes to communicate a secret message to a second user, represented by the recipient. The message may contain any type of digital information, including session keys used with symmetric cryptography algorithms to secure message traffic.

The term "Certification Authority (CA)" represents the entity responsible for managing the public-key infrastructure of the cryptosystem. The major functions of the CA may include the generation and distribution of digital certificates as well as public keys. The CA may be a single entity or may consist of a distributed or hierarchical structure of entities.

The term "authorizer" represents a third party trusted by a messager sender using the cryptosystem to certify that a message recipient has authority to receive a message encrypted to a message recipient. The authorizer may be a single entity or may consist of a distributed or hierarchical structure of entities. In many systems, the authorizer and the CA will be the same entity. However, this will not always be so. The message recipient's ability to decrypt a message can be contingent on authorization from any specified entity or entities.

The term "certificate" represents an identifier used by individual users of the cryptosystem to identify and authenticate themselves to other users. A certificate has certain attributes that enable users to trust the information contained in the certificate. Typically, a certificate consists of a digital signature on a document containing information such as the identity of the certificate owner, the public key of the certificate owner, the identity of the CA, an issue date, an expiration date, a serial number, and a parameter allowing users to verify that the certificate is genuine and valid. To verify the certificate, the verifier must know the document signed. This information is often sent with the certificate The term "public-key cryptosystem" represents a cryptosystem wherein a sender sends an encrypted message to a recipient. The sender encrypts the message using the recipient's public key. The recipient decrypts the encrypted message using the recipient's private key. Such a public key and private key form a "public key/private key pair". It is computationally infeasible to determine the recipient's private key from knowledge of the recipient's public key. Examples of public-key cryptosystems are the RSA Cryptosystem, in which the security of the private key is related to the difficulty of factoring large integers, and the ElGamal Cryptosystem, in which the security of the private key is related to the discrete logarithm problem. The term "form a public key/private key pair" will be understood by those skilled in the art to include a situation where the definitions of the public and private keys are redefined but the overall ability of the keys to encrypt and decrypt messages in maintained.

The terms "tree" and "B-tree" represent data structures that maintain an ordered set of data. A B-tree consists of "nodes", "leafs", and pointers connecting the nodes and leafs together. A "root node" defines the base, or first level, of the B-tree. A pointer connects the root node to each of a second level of nodes. The second level nodes are the child nodes of the root node. The root node is the parent node of the second level nodes. Further pointers may connect each of the second level nodes to their own child nodes and so on. "Leaf" nodes are the highest level of nodes of the B-tree. The leaf nodes are the child nodes of the next to highest level nodes and have no children of their own. Those nodes connecting a node to the root node, including the root node itself, are termed the ancestor nodes of this node.

The term "binary tree" represents a B-tree in which every node, except the leaf nodes, has at most two children.

The term "2-3 tree" represents a B-tree in every interior node has two or three children.

The term "Merkle tree" represents a B-tree whose nodes store values, some of which computed by means of a one-way function H, for example, a one-way hash function, in a specified manner. A leaf node can store any value, but each internal node should store a value that is the one-way function of the concatenation of the values in its children. For example, if an internal node has a two children, one storing the value U and the other storing a value V, then this node stores the value H(UV)).

Certificate-Based Encryption

The present invention describes "certificate-based encryption (CBE)" schemes where the ability of a message recipient user of a cryptosystem to decrypt a secret message from a message sender is contingent on the authorization of one or more trusted authorizers. The message recipient needs at least two keys to decrypt a message. One of these keys is a signature by one or more authorizers on one or more documents. The CBE protocols of the invention include a public-key encryption scheme and an adapted Identity-Based Encryption (IBE) scheme. Such protocols allow for CBE schemes including large numbers of users (e.g. millions of users) without destroying the algebraic structure necessary for CBE. In the protocols described below, a sender communicates an encrypted message to a recipient.

In the public-key encryption scheme, an entity, e.g. the recipient, generates a public key/private key pair (PKB, SKB) for the recipient. The recipient's public key is available to other users of the cryptosystem, including the sender. The other users can use this key to encrypt messages sent to the recipient. The recipient keeps the recipient private key secret and uses this key to decrypt messages encrypted with the recipient's public key.

A CBE protocol may incorporate any IBE scheme. An IBE scheme uses a trusted third party called a Private Key Generator (PKG). To set up, the PKG generates a master secret s, and publishes certain system parameters params that include a public key that masks S. The PKG may have many clients. Each client has some ID, which is simply a string that identifies it—e.g., the client's email address. The main algorithms in an IBE scheme are Private Key Generation, Encryption, and Decryption.

In the Private Key Generation algorithm, the PKG uses s, params and ID to compute a private key $d_{ID}$ corresponding to a given ID string. The message sender then uses the Encryption algorithm to compute the cyphertext C for the message M, using params, ID, and M. The message recipient used params, $d_{ID}$, and C to recover M.

In an IBE scheme adapted to implement a CBE scheme, the authorizer generates a recipient "decryption key" using a key generation secret that is a secret of the authorizer. The decryption key forms a public key/private pair with a recipient "encryption" key. In one embodiment, the recipient decryption key is a signature on the recipient encryption key generated using the key generation secret. The message sender encrypts a digital message using the recipient public key and the recipient encryption key to create an encrypted digital message. The recipient decrypts the encrypted digital message using the recipient private key and the recipient decryption key. Since the sender encrypts the message using both the recipient public key and the recipient encryption key, the recipient needs both the recipient private key and recipient decryption key to decrypt the encrypted message. Because both keys are required, the recipient decryption key need not be kept secret. For example, since the recipient decryption key is in fact a signature by one or more authorizers, the decryption can be treated as a signature; it can be used as verifiable proof that the recipient has received appropriate authorization.

In general, the encryption key can correspond to a document D and the decryption key to the signature $S_D$, the authorizer's signature on the document D using s, the authorizer's key-generation secret. If the decryption key, and hence the encryption key, are updated using a schedule known to the message sender, the sender can encrypt a message that the recipient can decrypt only when the recipient receives a decryption key corresponding to the encryption key used to encrypt the message.

The above scheme reduces the infrastructure overhead on the cryptosystem by avoiding the need for the sender to query to ensure that the recipient's private key is not compromised. The sender merely must know encryption key and the schedule on which the authorizer issues a new decryption key to the recipient. Without an up-to-date decryption key, an attacker knowing the recipient's private key cannot decrypt messages intended for the recipient. Thus, the CBE scheme allows the recipient's authorization to decrypt messages to be revoked if, for example, the recipient's private key is compromised. In such a situation, the authorizer stops issuing decryption keys to the recipient.

The scheme offers the additional advantage that it does not require the transmission of decryption keys to the recipient over a secure channel. Because decryption is not possible without the recipient's private key and the decryption key, the recipient need not keep the decryption key secret.

Because the authorizer knows the decryption key, it can decrypt messages encrypted by the encryption key. However, the sender avoids key escrow by doubly encrypting messages to the recipient using both the recipient's public key and encryption key. The authorizer cannot decrypt the message because it does not know the recipient's private key.

Although the encryption key can correspond to any document D, in many situations this document comprises parameters such as the recipient's identifying information ($PK_{IDB}$), including the recipient's public key ($PK_B$), and a parameter depending on the schedule by which the authorizer issues new decryption keys.

In a CBE scheme, the recipient's encryption key, the recipient's public key, and a parameter describing the schedule by which the authorizer issues new decryption keys are distributed to users of the cryptosystem, including the sender. The recipient can perform this function. Alternatively, a trusted third party, for example the CA or the authorizer, may perform the distribution.

Validity Period and Revocation

If the sender encrypts a message to the recipient using an encryption key that is valid for the current year, the recipient may use the corresponding decryption key for decryption during the current year. After this period, the recipient must obtain a new key from the authorizer. Likewise, if the sender encrypts a message using an encryption key that is valid for the current day, the recipient must obtain a new decryption key every day. Using this approach, a system may be created in which key revocation is automatic after any particular desired time-period. Similarly, the structure of the encryption may be such that the recipient can decrypt a message from a sender only at a pre-determined future time.

Other parameters, such as the recipient's security level, may also be included in the encryption key. If the sender encrypts a message using both a time parameter and a security level parameter, the recipient can decrypt the message only if the recipient has an up-to-date decryption key that specifies the required security level parameter. If the recipient's security level changes, the recipient will not be able to decrypt the sender's message.

A Pairing-Based CBE Scheme

A CBE scheme may incorporate any IBE scheme. Examples of such schemes are those based on Weil or Tate pairings associated with elliptic curves or abelian varieties. One embodiment of a CBE scheme of the present invention is described below. This embodiment uses the Boneh-Franklin IBE scheme and an identity-based encryption key comprising parameters such as the recipient's identifying information ($PK_{IDB}$), including the recipient's public key ($PK_B$), and a parameter depending on the schedule by which the authorizer issues new decryption keys. This embodiment is efficient and is provably secure (in the random oracle model) against adaptive chosen ciphertext attack.

Referring to the accompanying drawings, FIG. 1 shows a flow diagram illustrating the steps taken by a message recipient during a setup phase. This setup phase occurs before the recipient decrypts an encrypted message. In block 101, the recipient generates a public key/private key pair using a public-key cryptography protocol. In block 102, the recipient generates identifying information. In block 103, the recipient communicates identifying information, including the recipient's public key, to other users, including the message sender, and the authorizer.

Figure 2:
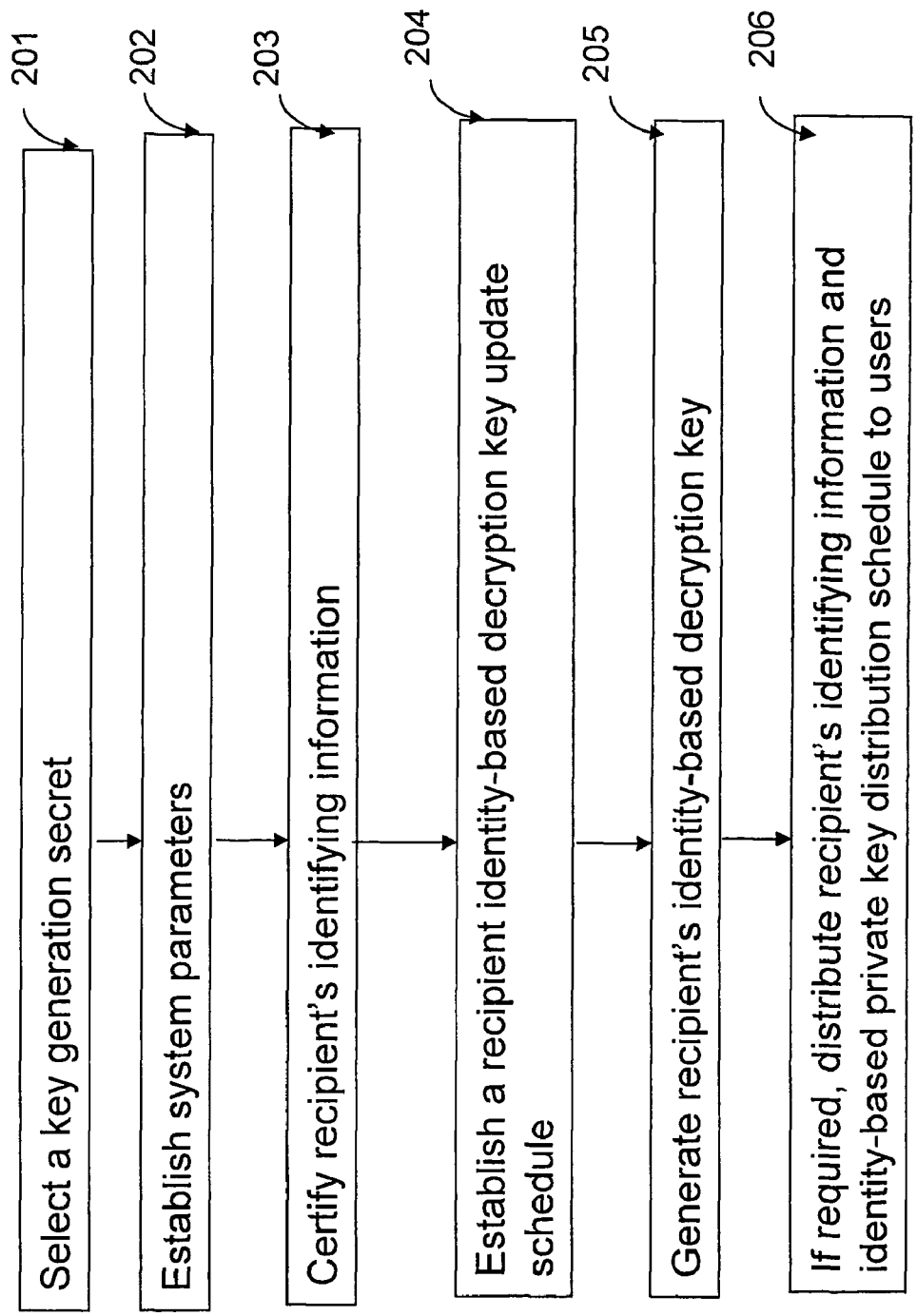
FIG. 2 shows a flow diagram illustrating the steps performed by an authorizer according to one embodiment of the invention.

FIG. 2 shows a flow diagram illustrating the steps taken by the authorizer during parameter setup and recipient certification. As used in the CBE scheme, the Boneh-Franklin IBE scheme generally includes four randomized algorithms: setup, certification, encryption, and decryption. Here, the authorizer is the equivalent of the Private Key Generator (PKG) in the conventional IBE scheme.

During setup, the authorizer uses a BDH parameter generator and a security parameter k to generate groups $G_1$ and $G_2$ of some prime order q and an admissible pairing ê: $G_1 \times G_1 \to G_2$. The pairing is defined as being admissible if it is bilinear: $ê(aQ, bR)=ê(Q, R)^{ab}$ for all $Q, R \in G_1$ and all $a, b \in Z$; non-degenerate: the mapping does not send all pairs in $G_1 \times G_1$ to the identity in $G_2$; and computable: there is an efficient algorithm to compute $ê(Q, R)$ for any $Q, R \in G_1$.

The Boneh-Franklin IBE scheme based on pairings, such as, for instance, the Weil or Tate pairings associated with elliptic curves or abelian varieties. The methods base their security on the Bilinear Diffie-Heilman problem. Here, the first group $G_1$ preferably is a group of points on an elliptic curve or abelian variety, and the group law on $G_1$ may be written additively. The second group $G_2$ preferably is a multiplicative subgroup of a finite field, and the group law on $G_2$ may be written multiplicatively. However, other types of groups may be used as $G_1$ and $G_2$ consistent with the present invention.

The Bilinear Diffie-Hellman problem is that of finding $ê(P, P)^{abc}$ if P, aP, bP, and cP are known, but a, b, and c are not known. Solving the Diffie-Hellman problem in $G_1$ solves the Bilinear Diffie-Hellman problem because $ê(P, P)^{abc}=ê(abP, cP)$. Similarly, solving the Diffie-Hellman problem in $G_2$ solves the Bilinear Diffie-Hellman problem because, if $g=ê(P, P)$, then $g^{abc}=(g^{ab})^c$ where $g^{ab}=ê(aP, bP)$ and $g^c=ê(P, cP)$. For instance, suppose E is a supersingular elliptic curve or abelian variety over a finite field F; suppose P ∈ E(F) is a point of order l (relatively prime to the characteristic of F); and suppose ê is the Weil pairing on the l-torsion on E. Let $G_1$ be the group generated by P, and let $G_2$ be the group of l-th roots of unity in the algebraic closure of F. If f is an automorphism of E such that f(P) ∉ $G_1$, then defining ê: $G_1 \times G_1 \to G_2$ by ê(Q, R)=e(Q,f(R)) gives a function ê that satisfies the two conditions set forth above. Further, this ê is non-degenerate. For instance, if ê(aP, bP)=ê(P, cP), then abP=cP.

In blocks 201 and 202 of FIG. 2, the authorizer selects a key generation secret and establishes system parameters by choosing an arbitrary generator P ∈ $G_1$, picking a random $s_c$ ∈ Z/qZ, setting Q=$s_c$P, and choosing cryptographic functions $H_1$: {0,1}*→$G_1$, $H_1'$: {0,1}*→$G_1$ and $H_2$: $G_2$→{0,1}$^n$ for some n. Here, the message space is M={0,1}$^n$, the system parameters are params=($G_1$, $G_2$, ê, P, Q, $H_1$, $H_1'$, $H_2$), and the authorizer's master key generation secret is sc ∈ Z/qZ.

In block 203, the authorizer certifies identifying information sent by the recipient, including the recipient's public key $s_B$P. In block 204, the authorizer establishes a schedule updating the recipient's identity-based decryption key. If verification is satisfactory, the authorizer generates the identity-based decryption key. The authorizer computes $P_B$=$H_1$($Inf_B$) ∈ $G_1$, where $Inf_B$ includes the recipient's identifying information (including the public key) and ancillary information such as a validity period, and $P'_B$=$H_1'$($ID_{rec}$), where $ID_{rec}$ comprises the public key of the recipient. In block 205, the authorizer then computes the recipient's identity-based decryption key $s_c P_B$ and sends this information to the recipient. The authorizer may also distribute the recipient's identifying information to other users as in block 206. Alternatively, another entity may perform this function.

Figure 3:
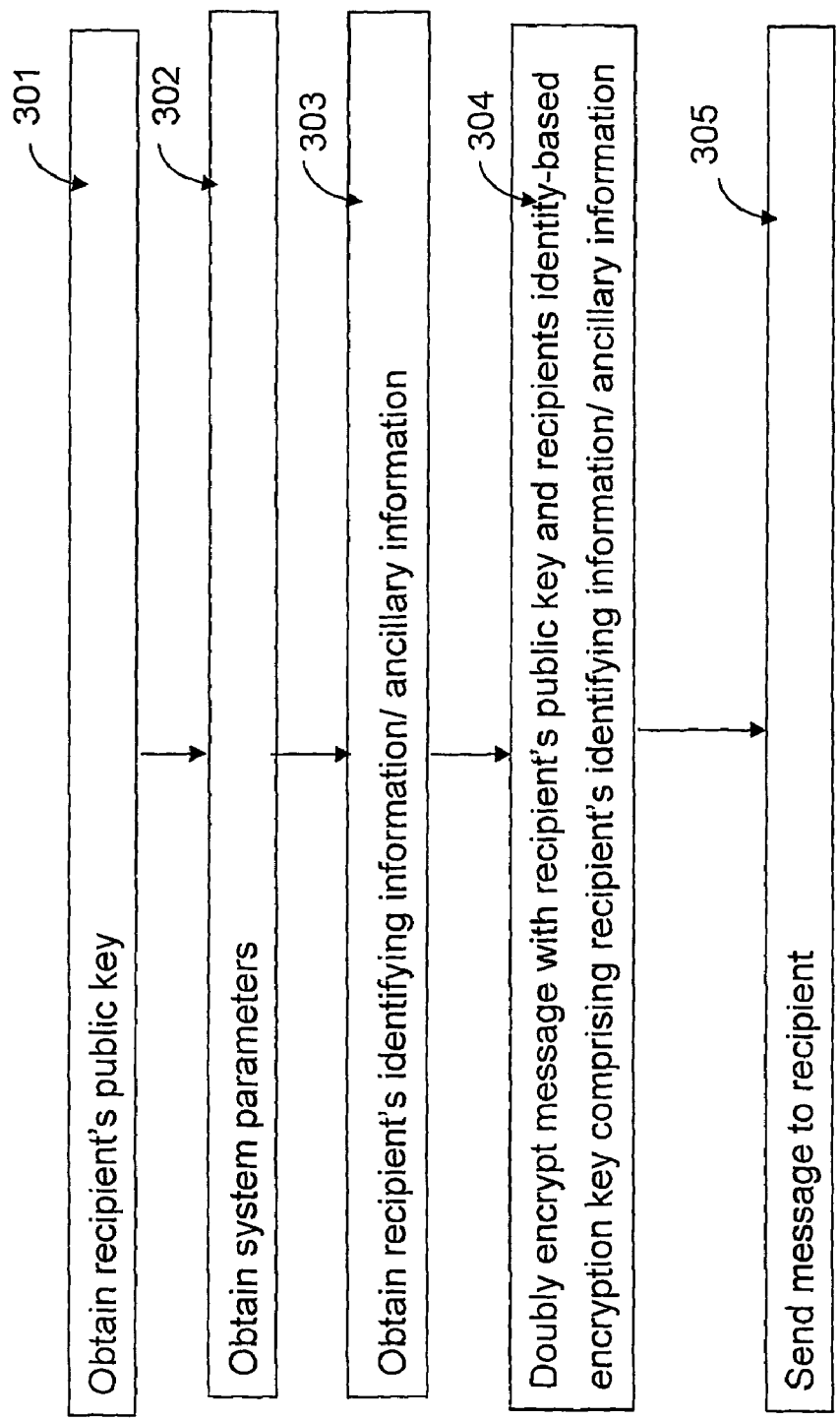
FIG. 3 shows a flow diagram illustrating the steps performed by a message sender according to one embodiment of the invention.

FIG. 3 shows a flow diagram illustrating the steps taken by the sender during encryption of a message. In blocks 301 and 302, the message sender obtains the recipient's public key and the system parameters. In block 303, the sender obtains the recipient's identity-based encryption key comprising the recipient's identifying information and the ancillary information, including the authorizer's identity-based decryption key generation schedule.

In block 304, the sender doubly encrypts the message M ∈ M with both $s_B$P and $Inf_B$ as follows. Initially, the sender computes $P_B$=$H_1$($Inf_B$) ∈ $G_1$, $P'_B$=$H_1'$($ID_{rec}$), wherein $ID_{rec}$ comprises the public key of the recipient, and then chooses a random r ∈ Z/qZ. The sender then sets the ciphertext to be:

$$C=[rP, M \oplus H_2(g^r)], \text{ where } g=\hat{e}(Q, P_B) \in G_2$$

In block 305, the sender sends the message to the recipient.

Let the ciphertext received by the recipient be C=[U,V]. During decryption, the recipient recovers M using $SK_B$ and $s_c P_B$. Specifically, the recipient first computes $S_B$=$s_c P_B$+$s_B P'_B$ and then computes:

$$V \oplus H_2(\hat{e}(U, S_B))=M.$$

CBE can be made secure in the random oracle model against adaptive chosen-ciphertext attack by using, for example, the Fujisaki-Okamoto transform in a manner similar to that described for IBE by D. Boneh, & M. Franklin, (2001). The transformed scheme uses two additional cryptographic functions $H_3$ and $H_4$ and a semantically symmetric encryption scheme $E_{H4(\sigma)}$. $H_3$ is a function capable of generating an integer of the cyclic group Z/qZ from two strings of binary digits and $H_4$ is a function capable of generating one binary string from another binary string. $_{H4(\sigma)}$ is the key used with E.

In the transformed scheme, the message sender chooses a random σ∈{0,1}$^n$ and sets r=$H_3$(σ,M). The sender then sets the ciphertext to be: C=[rP,σ⊕$H_2$($g^r$),$E_{H4(\sigma)}$(M)] where g=ê(Q, $P_B$)ê($s_B$P, $P'_B$)∈ $G_2$.

The message recipient decrypts [U,V,W] by computing σ=V⊕$H_2$ (ê(U,$s_c P_B$)) and M=$H_{H4(\sigma)}^{-1}$(W). The recipient also sets r=$H_3$(σ,M) and rejects the ciphertext if U≠rP.

Hierarchical CBE

In yet another embodiment of the present invention, a CBE scheme combines a Hierarchical Identity Based Encryption (HIDE) scheme and a public-key encryption scheme. As in the non-hierarchical scheme discussed above, the encryption key can correspond to any document D. In the following description, the key is comprised of parameters such as the recipient's identifying information ($PK_{IDB}$), including the recipient's public key ($PK_B$), and a parameter describing the schedule by which the authorizer issues new decryption keys.

A hierarchical identity-based key sharing scheme with partial collusion-resistance is described in G. Hanaoka, T. Nishioka, Y. Zheng, H. Imai, *An Efficient Hierarchical Identity-Based Key-Sharing Method Resistant Against Collusion Attacks*, ADVANCES IN CRYPTOGRAPHY—ASIACRYPT 1999, Lecture Notes in Computer Science 1716 (1999), Springer 348-362; and G. Hanaoka, T. Nishioka, Y. Zheng, H. Imai, A Hierarchical Non-Interactive Key-Sharing Scheme With Low Memory Size and High Resistance Against Collusion Attacks, to appear in THE COMPUTER JOURNAL. In addition, an introduction to hierarchical identity-based encryption was provided in J. Horwitz, B. Lynn, Toward Hierarchical Identity-Based Encryption, to appear in ADVANCES IN CRYPTOGRAPHY—EUROCRYPT 2002, Lecture Notes in Computer Science. Springer. Horwitz and Lynn proposed a two-level hierarchical scheme with total collusion-resistance at the first level and partial collusion-resistance at the second level (i.e., users can collude to obtain the secret of their domain PKG and thereafter masquerade as that domain PKG). However, the complexity of the Horwitz-Lynn system increases with the collusion-resistance at the second level, and the scheme therefore cannot be both practical and secure.

Secure and practical HIDE schemes are described in U.S. patent application Ser. No. 10/384,328, now U.S. Pat. No. 7,349,538, issued on Mar. 25, 2008, the contents of which are incorporated herein for all purposes by this reference.

The present hierarchical CBE (HCBE) scheme adapts the HIDE scheme to CBE, and it includes six randomized algorithms: Root Setup, Lower-level Setup, Certification, Extraction, Encryption, and Decryption. Four of these algorithms rely upon the identities of the relevant entities in the hierarchy. Each user preferably has a position in the hierarchy that may be defined by its tuple of IDs: ($ID_1$, . . . , $ID_t$). The user's ancestors in the hierarchy are the root authorizer and the lower level authorizers whose ID-tuples are {($ID_1$, . . . , $ID_i$): 1≤i≤t−1}. Preferably, binary strings represent the ID-tuples for purposes of computations.

The Root Setup algorithm is similar to that for the non-hierarchical scheme described above. The root authorizer uses a security parameter k to generate public system parameters params and a root key generation secret in the same manner as the authorizer in a non-hierarchical scheme. Again, the system parameters will be publicly available, but only the root authorizer will know the root key generation secret.

In the Lower-level Setup algorithm, lower-level authorizers may retrieve the system parameters from the root authorizer. Unlike the root authorizer, the lower-level authorizers do not have "lower-level" parameters used in the Encryption algorithm. However, this constraint does not necessarily preclude a lower-level authorizer from generating its own lower-level secret, which it may use to generate and issue identity-based decryption keys to its users. A lower-level authorizer may generate its own lower-level key generation secret for purposes of extraction. Alternatively, a lower-level authorizer may generate random one-time secrets for each extraction.

In the Extraction algorithm, a parent authorizer (whether the root authorizer or a lower-level authorizer) verifies identifying information sent by a child authorizer immediately below it in the hierarchy. The parent authorizer may also establish a schedule for update of the child authorizer's recipient's identity-based decryption key. If verification is satisfactory, the parent authorizer generates an identity-based decryption key for the child authorizer. As in the non-hierarchical scheme, this identity-based decryption key is generated using the system parameters, the child authorizer's identifying information and ancillary information such as a validity period. The child authorizer's identity-based decryption key is also related to the key generation secret of at least one ancestral authorizer. The parent authorizer then sends this decryption to the child authorizer. The child authorizer's identifying information is available to other users.

In the Certification algorithm, a signing authorizer having at least one ancestor in the hierarchy certifies identifying information sent by the recipient, including the recipient's public key $PK_B$. The authorizer also establishes a schedule for update of the recipient's identity-based decryption key. If verification is satisfactory, the authorizer generates an identity-based decryption key $SK_{HIDB}$ for the recipient. As in the non-hierarchical scheme, key $SK_{HIDB}$ is generated using the system parameters, the recipient's identifying information (including the public key) and ancillary information such as a validity period. $SK_{HIDB}$ is also related to the key generation secret of at least one ancestral authorizer. The authorizer then sends key $SK_{HIDB}$ to the recipient. The recipient's identifying information $Inf_B$ is available to other users.

In the Encryption algorithm, a sender doubly encodes a message M to an intended recipient using both the intended recipient's public key $PK_B$ and params and the recipient's identity-based encryption key, comprising information included in $Inf_B$ and the ID-tuple of the intended recipient.

Conversely, in the Decryption algorithm, the recipient decodes the ciphertext C to recover the message M using the recipient's private key $SK_B$ and identity-based decryption key ($SK_{HIDB}$).

Pairing Based Hierarchical CBE

One embodiment of the HCBE scheme of the present invention is based on pairings, such as, the Weil or Tate pairings associated with elliptic curves or abelian varieties, and on the Bilinear Diffie-Hellman problem described above.

Figure 4:
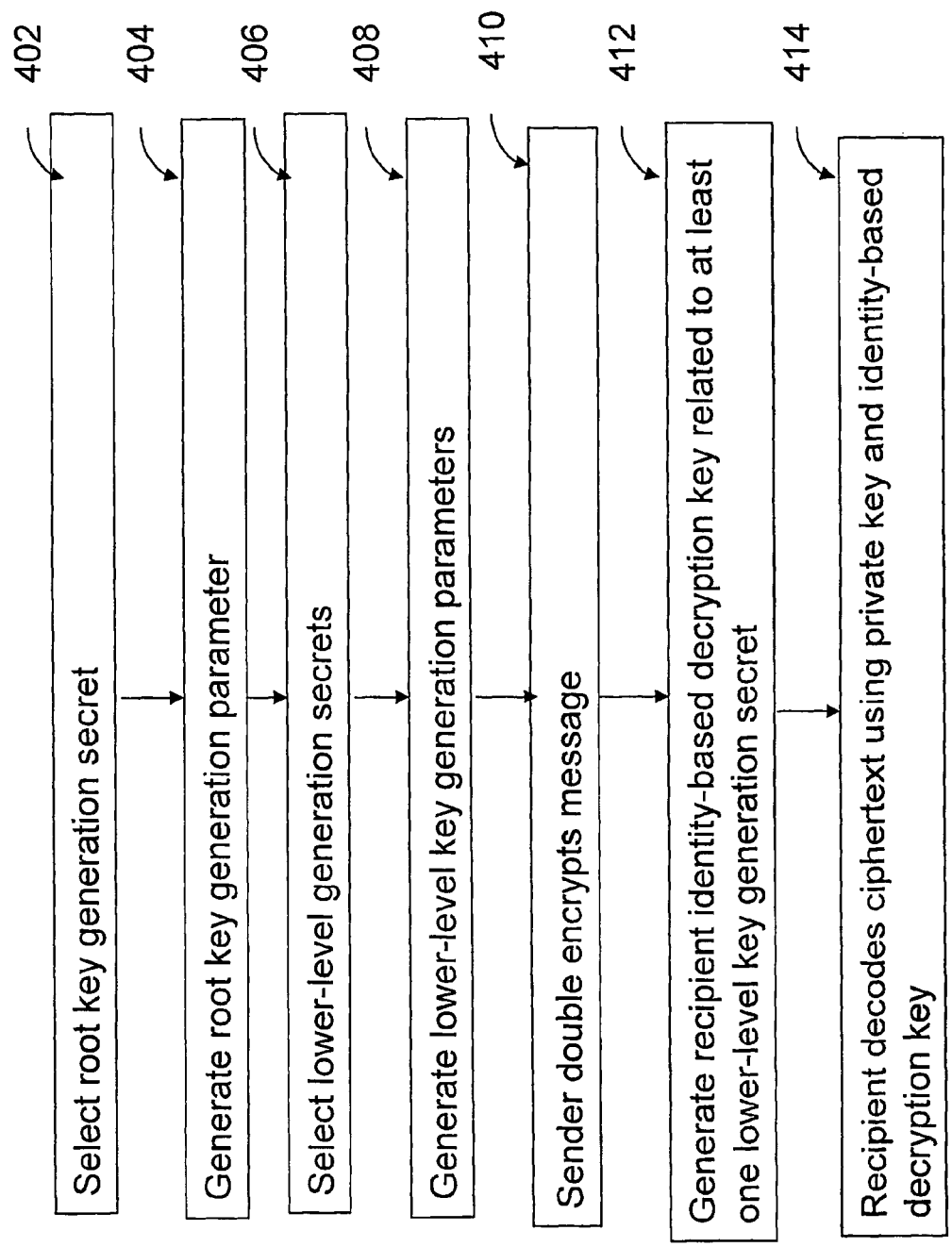
FIG. 4 shows a flow diagram illustrating a Hierarchical Certificate-Based Encryption scheme according to another embodiment of the invention.

FIG. 4 shows a flow-diagram illustrating a method of encoding and decoding a digital message in a HIDE system including a plurality of authorizers according to one embodiment of the invention. The authorizers include at least a root authorizer and n lower-level authorizers in the hierarchy between the root authorizer and the recipient, wherein $n \geq 1$. In block 402, the root authorizer selects a root key generation secret known only to the root authorizer. The root authorizer then generates a root key generation parameter based on the root key generation secret in block 404. The lower-level authorizers select lower-level key generation secrets in block 406. Like the root key generation secret, each of the lower-level key generation secrets is known only to its associated lower-level authorizer. In block 408, lower-level key generation parameters are generated for each of the n lower-level authorizers. Each of the lower-level key generation parameters is generated using at least the lower-level key generation secret for its associated lower-level authorizer. Like the root key generation parameter, each of the lower-level key generation parameters masks its associated lower-level key generation secret.

Using at least one of the key generation parameters and the recipient identity-based encryption key, the sender encodes the message in block 410 to form a ciphertext. For instance, the sender may encode the message using only the root key generation parameter and the recipient's public key. Alternatively, the sender may use one of the lower-level key generation parameters, as described in more detail below with respect to dual-HCBE schemes. In block 412, a lower-level authorizer generates an identity-based decryption key for the recipient such that the identity-based decryption key is related to at least one of the n lower-level key generation secrets. For instance, the recipient's identity-based decryption key preferably is related at least to the lower-level key generation secret of the authorizer that issued the identity-based decryption key to the recipient. Alternatively, the recipient's identity-based decryption key may be related to all n of its ancestral authorizer's lower-level key generation secrets, as well as the root key generation secret. In block 414, the recipient uses at least its identity-based decryption key and its private key to decode the ciphertext and recover the message.

Each lower-level authorizer has a key generation secret, just like the root authorizer. As described above, a lower-level authorizer preferably uses this secret to generate a private key for each of its children, just as the root authorizer does. However, the lower-level authorizers need not always use the same secret for each identity-based decryption key extraction. Rather, a new key generation secret may be generated randomly for each of the authorizer's clients.

Because a lower-level authorizer is able to generate an identity-based decryption key for the recipient (block 412), the root authorizer need not generate all of the identity-based decryption keys itself. In addition, because the lower-level authorizers use their own key generation secrets to generate identity-based decryption keys for their clients, compromising a lower-level key generation secret causes only limited security damage to the hierarchy. Rather than compromising all of the identity-based decryption keys in the hierarchy, a breach of a lower-level authorizer compromises only those identity-based decryption keys that were generated using that authorizer's key generation secret (i.e., only the identity-based decryption keys of those users that are direct hierarchical descendants of the compromised authorizer).

Another advantage of this embodiment is that the sender need not be in the hierarchy to send an encoded message to the recipient. The sender merely needs to know the identity of the recipient, the recipient's public key and the system parameters generated by the root authorizer. There are, however, certain additional advantages of the HIDE schemes of the present invention that become available when the sender is within the hierarchy. For instance, when both the sender and the recipient are in the hierarchy, using the identities of both parties improves the efficiency of the message encryption. This type of HCBE scheme is called dual-HCBE because the identities of both the sender and the recipient are used as input for the encryption and decryption algorithms. A method of encoding and decoding a message using a dual-HCBE scheme is now discussed with reference to FIGS. 5 and 6.

Figure 5:
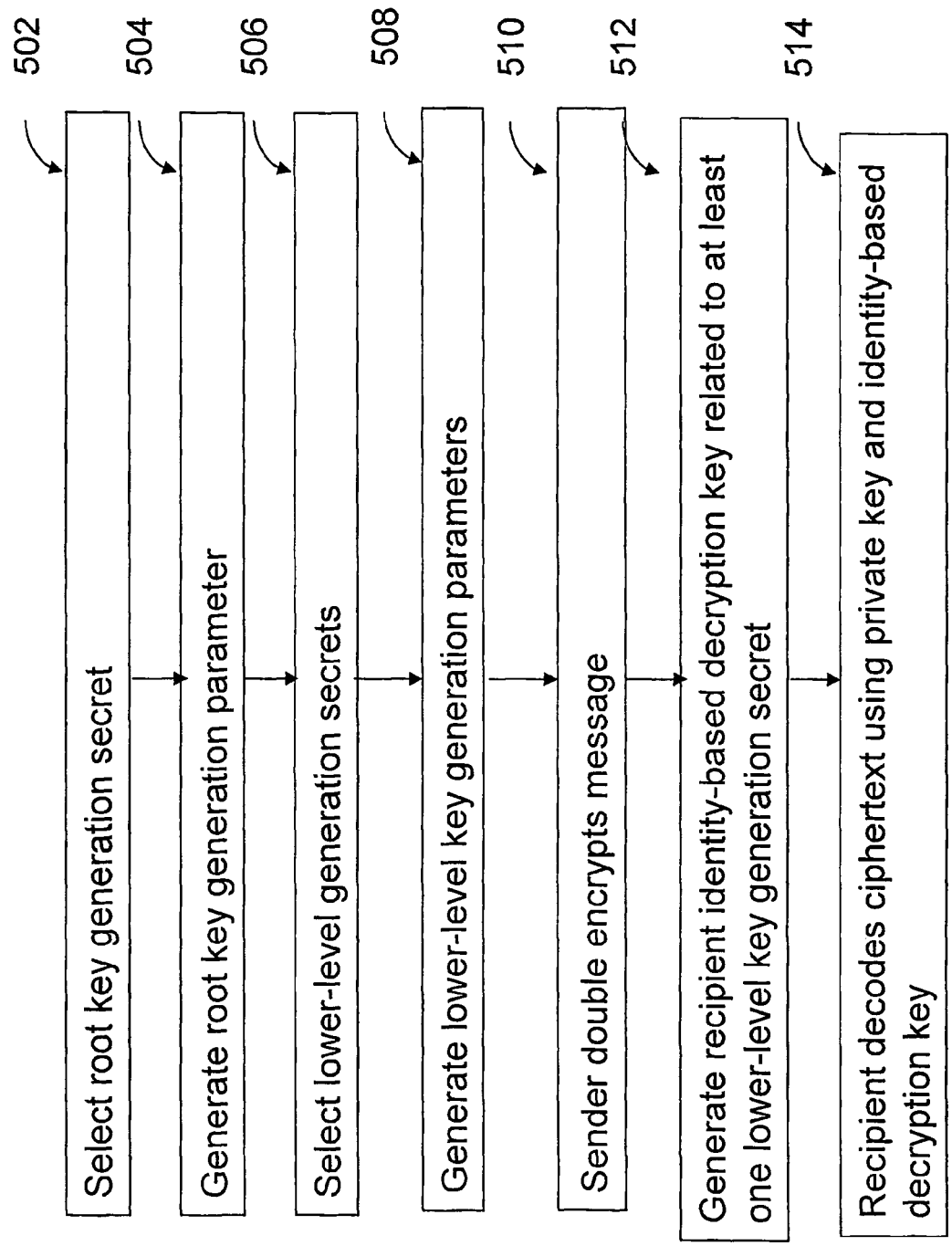
FIG. 5 shows a flow diagram illustrating another Hierarchical Certificate-Based Encryption scheme according to an embodiment of the invention.
Figure 6:
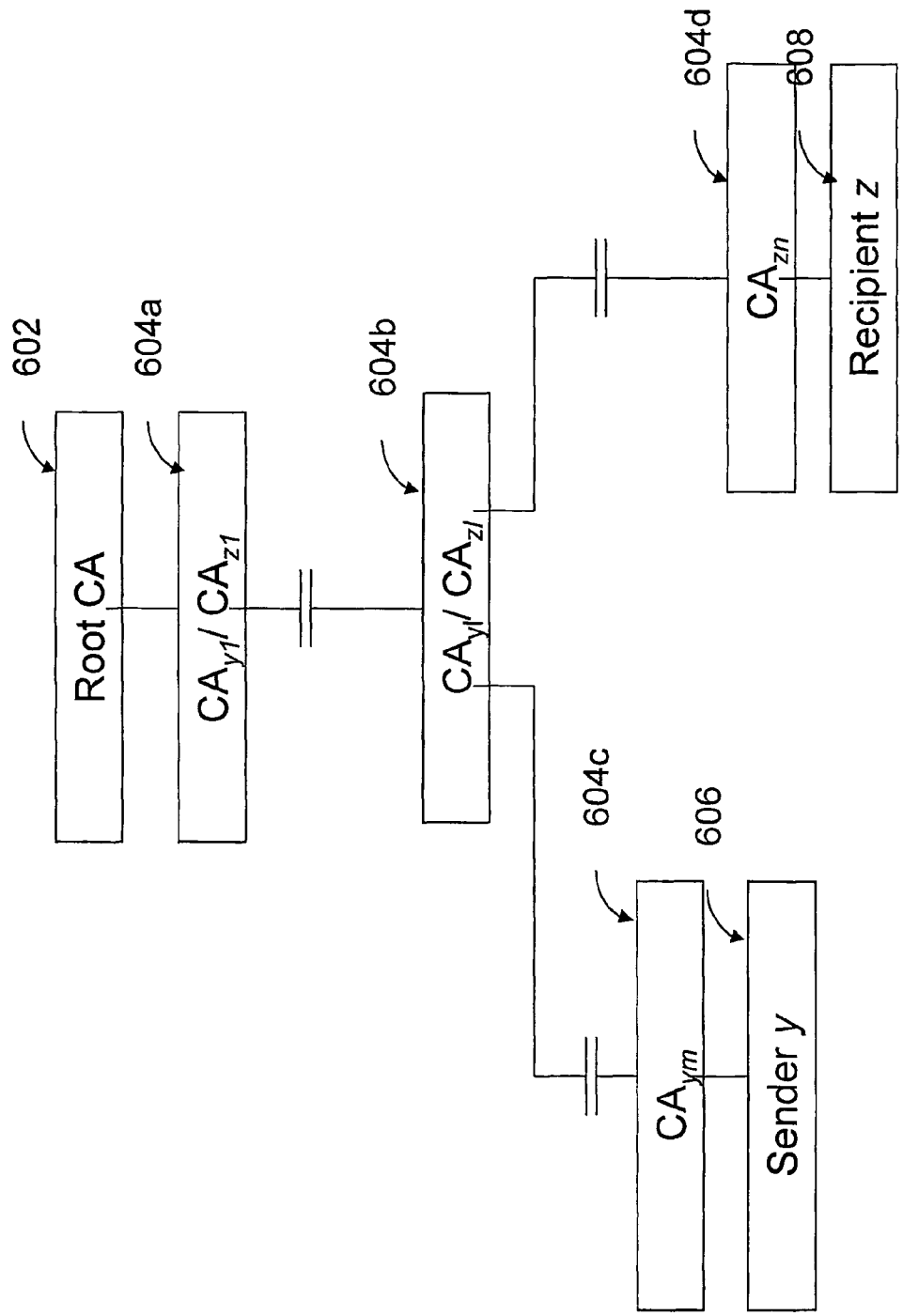
FIG. 6 shows a block diagram illustrating a typical hierarchical structure in which the method of FIG. 5 may be performed.

FIG. 5 shows a flow diagram illustrating a method of encrypting and decrypting message between a sender y and a recipient z according to another embodiment of the invention. FIG. 6 shows a block diagram illustrating a typical hierarchical structure. Like the previous embodiment, this method is performed in a HCBE system including at least a root authorizer 602 and n lower-level authorizers 604a,b,d in the hierarchy between the root authorizer 602 and the recipient z 608, wherein n≧1. The sender y 606 in this embodiment also must be in the hierarchy, and the hierarchy also includes m lower-level authorizers 604a,b,c between the root authorizer 602 and the sender y 606, wherein m≧1. Of the m authorizers 604a,b,c between the root authorizer 602 and the sender y 606, and the n authorizers 604a,b,d between the root authorizer 602 and the recipient z 608, there are l authorizers 604a,b that are common ancestors to both the sender y 606 and the recipient z 608, wherein 1≦l≦m, n. For instance, FIG. 6 shows two of these l common ancestral authorizers ($CA_{y1}/CA_{z1}$ 604a and $CA_{yl}/CA_{zl}$ 604b).

The method of this embodiment begins in block 502, when the root authorizer 602 selects a root key generation secret known only to the root authorizer. The root authorizer 602 then generates a root key generation parameter based on the root key generation secret in block 504. The lower-level authorizers 604a-d select lower-level key generation secrets in block 506. Like the root key generation secret, each of the lower-level key generation secrets is known only to its associated lower-level authorizer 604a-d. In block 508, lower-level key generation parameters are generated for each of the n lower-level authorizers 604a-d. Each of the lower-level key generation parameters is generated using at least the lower-level key generation secret for its associated lower-level authorizer 604a-d.

In block 510, the sender's parent $CA_{ym}$ 604c generates an identity-based decryption key for the sender y 606 such that the identity-based decryption key is related to at least one of the m lower-level key generation secrets associated with the m lower-level authorizers 604a,b,c between the root authorizer 602 and the sender y 606. For instance, the sender's identity-based decryption key preferably is related at least to the lower-level key generation the sender's parent $CA_{ym}$ 604c. Alternatively, the sender's identity-based decryption key may be related to all in of its direct ancestral authorizers' lower-level key generation secrets, as well as the root key generation secret. The sender's identity-based encryption key can correspond to any document D, but, in the following description, the key comprises parameters such as the sender's identifying information ($PK_{IDA}$), including the sender's public key ($PK_A$), and a parameter describing the schedule by which the authorizer issues new decryption keys. In block 512, the recipient's parent $CA_{zn}$ 604d generates an identity-based decryption key for the recipient z in a similar manner that the sender's parent $CA_{ym}$ 604c used to generate the sender's identity-based decryption key. As in HCBE, the recipient's identity-based encryption key can correspond to any document D, but, in the following description, the key comprises parameters such as the recipient's identifying information ($PK_{IDB}$), including the recipient's public key ($PK_B$), and a parameter describing the schedule by which the authorizer issues new decryption keys.

In block 514, the sender y encodes the message to form a ciphertext. It uses at least the recipient's public key, the sender's identity-based decryption key and one or more of the lower-level key generation parameters associated with the (m-l+1) authorizers (i.e., $CA_{yl}$, 604b and $CA_{ym}$, 604c) between the root authorizer 602 and the sender y 606 that are at or below the level of the lowest ancestor authorizer ($CA_{yl}/CA_{zl}$ 604b) that is common to both the sender y 606 and the recipient z 608. In encoding the message, the sender y 606 preferably does not use any of the lower-level key generation parameters that are associated with the (l-1) authorizers (i.e., $CA_{y1}$ 604a) that are above the lowest common ancestor authorizer ($CA_{yl}/CA_{zl}$ 604b). Again, the lower-level key generation parameters are related to the recipient's identifying information and the ancillary information, including the authorizer's identity-based decryption key generation schedule.

The recipient z 608 then decodes the ciphertext to recover the message in block 516. It uses at least the recipient's private key, the recipient's identity-based decryption key and one or more of the lower-level key generation parameters associated with the (n-l+1) authorizers (i.e., $CA_{zl}$, 604b and $CA_{zn}$ 604c) between the root authorizer 602 and the recipient z 608 that are at or below the level of the lowest ancestor authorizer ($CA_{yl}/CA_{zl}$ 604b) that is common to both the sender y 606 and the recipient z 608. In decoding the message, the recipient y 606 preferably does not use any of the lower-level key generation parameters that are associated with the (l-1) authorizers (i.e., $CA_{z1}$ 604a) that are above the lowest common ancestor authorizer ($CA_{yl}/CA_{zl}$ 604b).

The dual-HCBE embodiment of the invention provides a more efficient scheme for encoding and decoding the message because it requires the use of fewer key generation parameters. For instance, decoding in a regular HCBE scheme preferably requires all n of the key generation parameters, decoding in a dual-HCBE scheme preferably requires only (n-l) of the key generation parameters. Dual-HCBE schemes require that the sender y 606 obtain its identity-based decryption key before sending an encoded message to the recipient z 608, as opposed to merely obtaining the public system parameters of the root authorizer.

The dual-HCBE schemes also enable the sender y 606 and the recipient z 608 to use a limited form of key escrow, as described more fully below. This shared secret is unknown to third parties other than their lowest common ancestor $CA_{yl}/CA_{zl}$ 604b. However, the CBE schemes of the present invention avoid key escrow entirely. Nevertheless, dual-HCBE continues to offer the advantages of shorter ciphertext length and decryption time.

Figure 7:
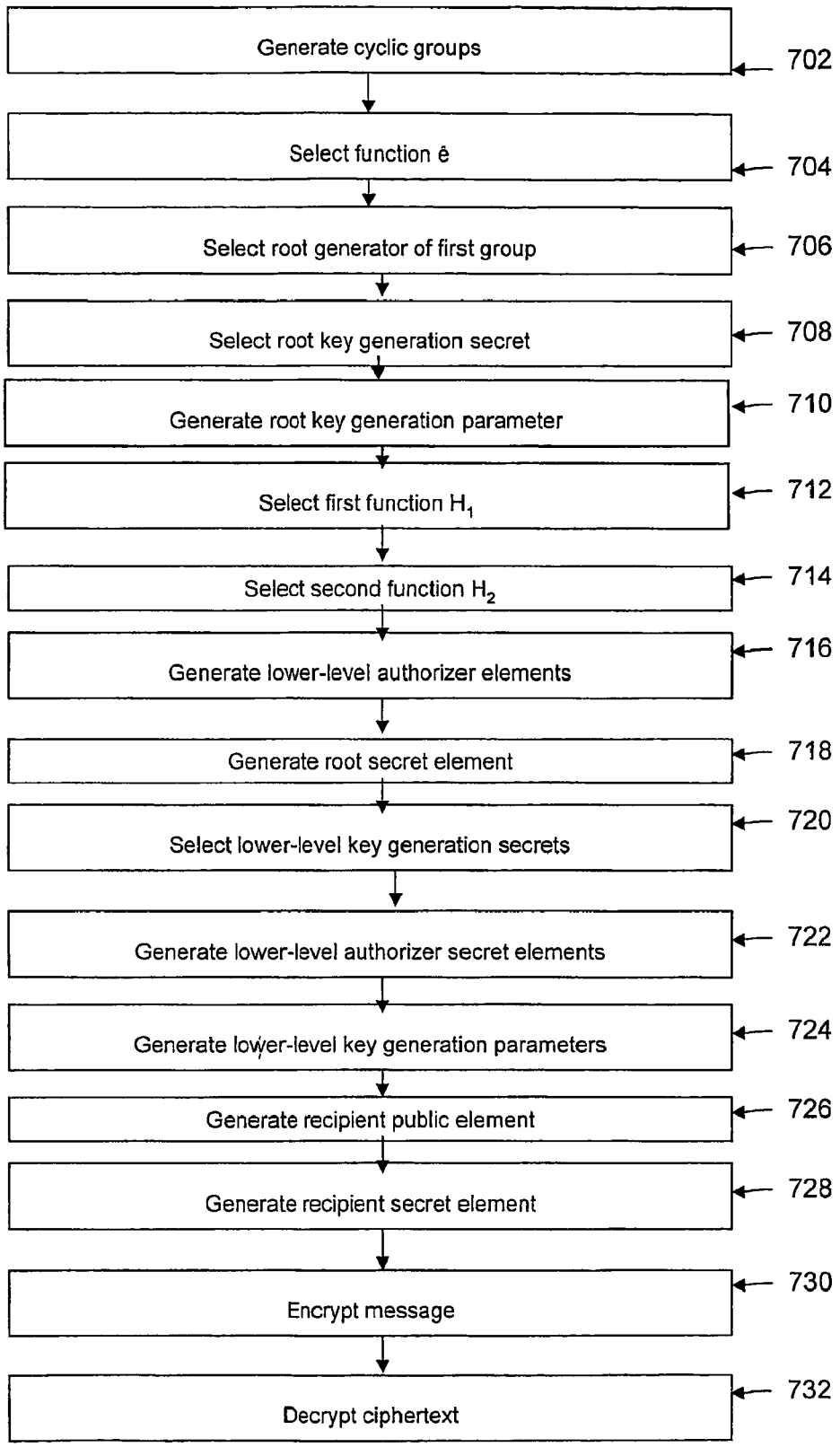
FIG. 7 shows a flow diagram illustrating a method of encoding and decoding a digital message Mcommunicated between a sendery and a recipient z according to another embodiment of the invention.

FIG. 7 shows a flow diagram illustrating a method of encoding and decoding a digital message M communicated between a sender y and a recipient z according to another embodiment of the invention. The recipient z 608 is n+1 levels below the root authorizer in the hierarchy, as shown in FIG. 6, and is associated with the ID-tuple ($ID_{z1}, \ldots, ID_{z(n+1)}$). The recipient's ID-tuple includes identity information $ID_{zi}$ associated with the recipient, as well as identity information $ID_{zi}$ associated with each of its n ancestral lower-level authorizers in the hierarchy.

The method begins in block 702 by generating the first and second cyclic groups $G_1$ and $G_2$ of elements. In block 704, a function ê is selected such that the admissible pairing ê is capable of generating an element of the second cyclic group $G_2$ from two elements of the first cyclic group $G_1$. A root generator $P_0$ of the first cyclic group $G_1$ is selected in block 706. In block 708, a random root key generation secret so associated with and known only to the root authorizer 602 is selected. Preferably, $s_0$ is an element of the cyclic group Z/qZ. A root key generation parameter $Q_0 = s_0 P_0$ is generated in block 710. Preferably, $Q_0$ is an element of the first cyclic group $G_1$. In block 712, a first function $H_1$ is selected such that $H_1$ is capable of generating an element of the first cyclic group $G_1$ from a first string of binary digits. For simplicity, only one function capable of generating an element of the first cyclic group $G_1$ from a first string of binary digits needs to be used, but several different functions of this type may be used at different points in the algorithm. A second function $H_2$ is selected in block 714, such that $H_2$ is capable of generating a second string of binary digits from an element of the second cyclic group $G_2$. The functions of blocks 702 through 714 are part of the non-hierarchical and HCBE Root Setup algorithms described above, and can be performed at about the same time.

The next series of blocks (blocks 716 through 724) show the functions performed as part of Lower-level Setup algorithm. In block 716, a element $P_{zi}$ is generated for each of the recipients' n ancestral lower-level authorizers. Each of the elements, $P_{zi}=H_1(ID_1, \ldots, ID_{zi})$ for $1 \leq i \leq n$, preferably is an element of the first cyclic group $G_1$. Although represented in a single block, generation of all the public elements $P_{zi}$ may take place over time, rather than all at once.

A lower-level secret $s_{zi}$ is selected (block 720) for each of the recipients' n ancestral lower-level authorizers 604a,b,d. The lower-level secrets $s_{zi}$ preferably are elements of the cyclic group $Z/qZ$ for $1 \leq i \leq n$, and each lower-level key generation secret $s_{zi}$ preferably is known only to its associated lower-level authorizer. Again, although represented in a single block, selection of all the secrets $s_{zi}$ may take place over time, rather than all at once.

A lower-level secret element $S_{zi}$ is generated (block 722) for each of the sender's n ancestral lower-level authorizers. Each lower-level secret element, $S_{zi}=S_{z(i-1)}+s_{z(i-1)}P_{zi}$ for $1 \leq i \leq n$, preferably is an element of the first cyclic group $G_1$. Although represented in a single block like the public elements $P_{zi}$ and the secrets $s_{zi}$ generation of all the secret elements $S_{zi}$ may take place over time, rather than all at once.

A lower-level key generation parameter $Q_{zi}$ also is generated (block 724) for each of the recipients' n ancestral lower-level authorizers. Each of the key generation parameters, $Q_{zi}=s_{zi}P_0$ for $1 \leq i \leq n$, preferably is an element of the second cyclic group $G_2$. Again, although represented in a single block, generation of all the key generation parameters $Q_{zi}$ may take place over time, rather than all at once.

The functions of the next two blocks (blocks 726 and 728) are performed as part of the Certification algorithm described above. A recipient element $P_{z(n+1)}$ associated with the recipient z is generated in block 726. The recipient element, $P_{z(n+1)}=H_1(Inf_{z(n+1)}, ID_{z1}, \ldots, ID_{z(n)})$, preferably is an element of the first cyclic group $G_1$. Here, $Inf_{z(n+1)}$ is a string of binary digits that may include the recipient's public key and ancillary information such as the validity period of the recipient's identity-based decryption key. A recipient secret element $S_{z(n+1)}$ associated with the recipient z is then generated in block 728. The recipient decryption key $$S_{z(n+1)} = S_{zn} + s_{zn}P_{z(n+1)} = \sum_{i=1}^{n+1} s_{z(i-1)}P_{zi},$$

also preferably is an element of the first cyclic group $G_1$. Using the recipient decryption key and SKB, the recipient computes $S_B=S_{z(n-1)}+s_BP'_B$.

For convenience, the first function $H_1$ optionally may be chosen to be an iterated function so that, for example, the public points $P_i$ may be computed as $H_1(P_{z(i-1)}, ID_{zi})$ rather than $H_1(ID_1, \ldots, ID_{zi})$.

The last two blocks shown in FIG. 7 (blocks 730 and 732) represent the Encryption and Decryption algorithms described above. In block 730, the sender encrypts message M to generate a ciphertext C. The encoding preferably uses at least the recipient's public key and the root key generation parameter $Q_0$. The recipient decrypts ciphertext C in block 732 to recover the message M The decoding preferably uses at least the lower-level key generation parameters $Q_{zi}$ and the recipient decryption key $S_{z(n+1)}$ and the recipient private key. The specific use of the parameters and elements in the encoding and decoding of the message M and the ciphertext C is now discussed with reference to FIGS. 8 and 9.

Figure 8:
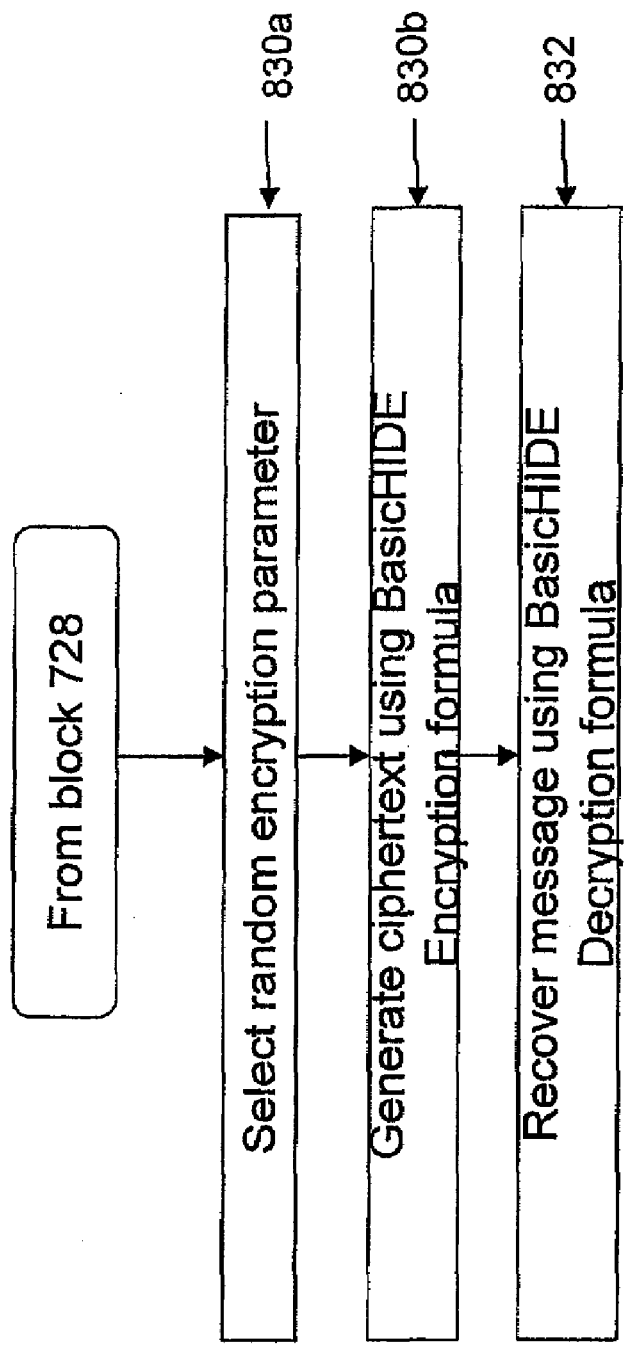
FIG. 8 shows a flow diagram illustrating a method of encoding and decoding a digital message M.

FIG. 8 shows a flow diagram illustrating a method of encoding and decoding a digital message M communicated between a sender y and a recipient z according to another embodiment of the invention. In this scheme, referred to as BasicHCBE, the Root Setup, Lower-level Setup, Extraction and Certification algorithms are the same as for the embodiment shown in blocks 702 through 728 of FIG. 7. Accordingly, the flow diagram of FIG. 8 begins with the selection of a random encryption parameter r in block 830a. Preferably, r is an integer of the cyclic group $Z/qZ$. The ciphertext C is then generated in block 830b using the formula $C=[rP_0, rP_{z2}, \ldots, rP_{z(n+1)}, V]$, wherein $V=M \oplus H_2(g^r)$, wherein $g=\hat{e}(Q_0, P_{z1})\hat{e}(s_BP, P'_B)$. Here, $s_BP$ is the recipient public key, $P'_B$ is $H_1(Inf_{rec})$, wherein $Inf_{rec}$ comprises the recipient's public key.

After the message has been encoded, it may be decoded according to the BasicHCBE Decryption algorithm, in which the message M is recovered from the ciphertext C (block 832) using the formula $$M = V \oplus H_2\left(\frac{\hat{e}(U_0, S_{n+1})}{\prod_{i=2}^{n+1} \hat{e}(Q_{i-1}, U_i)}\right).$$

Figure 9:
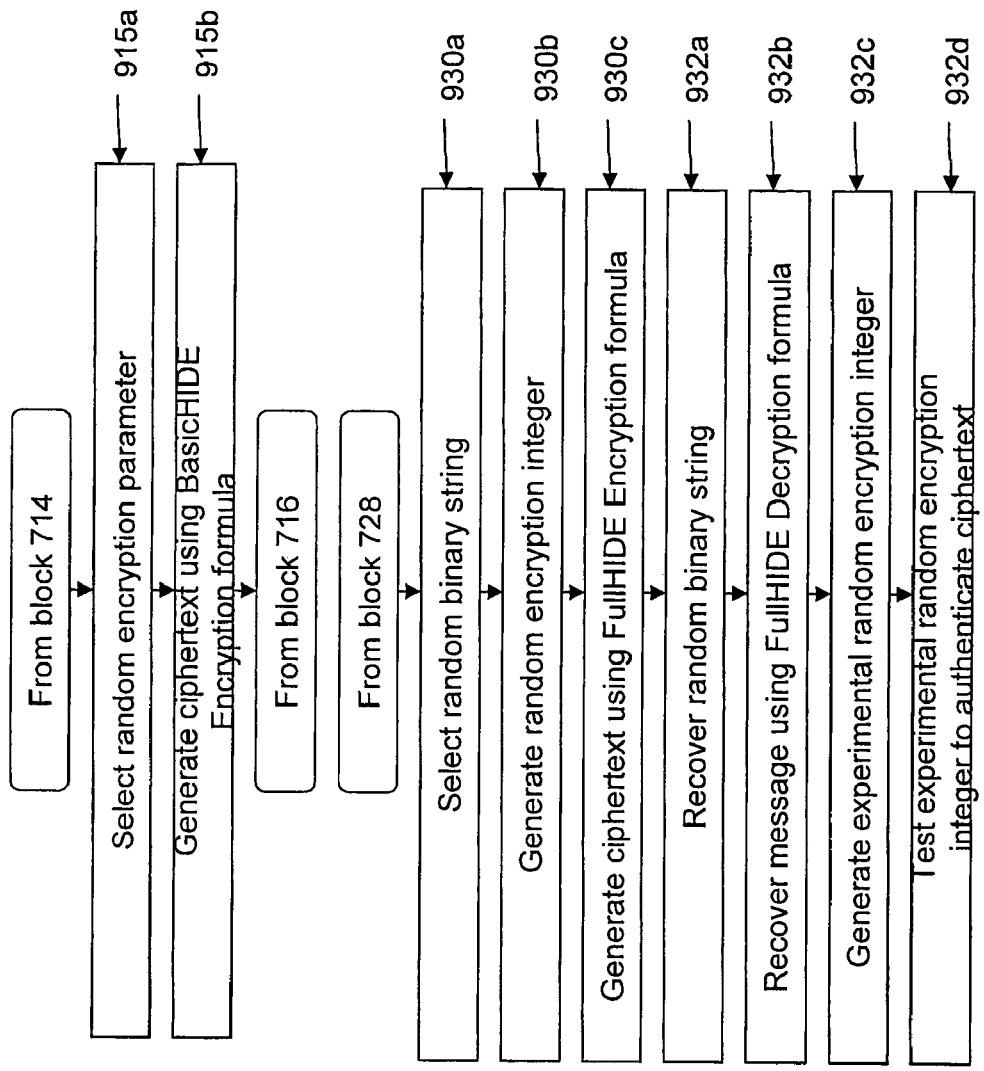
FIG. 9 shows a flow diagram illustrating a method of encoding and decoding a digital message Mcommunicated between a sendery and a recipient z according to another embodiment of the invention.

Known methods for making one-way encryption schemes secure against chosen-ciphertext attacks allow conversion of a BasicHCBE scheme to a FullHCBE scheme that is chosen-ciphertext secure in the random oracle model. FIG. 9 illustrates a FullHIDE based scheme that is chosen-ciphertext secure.

FIG. 9 shows a flow diagram illustrating a method of encoding and decoding a digital message M communicated between a sender y and a recipient z according to another presently preferred embodiment of the invention. The Root Setup, Lower-level Setup, Extraction and Certification algorithms are the same for this embodiment of the invention as for the embodiment described with reference to FIG. 7, except that the Root Setup algorithm of this embodiment requires two additional functions. Accordingly, the flow diagram of FIG. 9 begins with the selection of the additional functions (blocks 915a and 915b) and continues with the Encryption and Decryption algorithms (blocks 930a through 932d).

The Root Setup algorithm is completed by selecting a third function $H_3$ (block 915a) and a fourth function $H_4$ (block 915b). The third function $H_3$ preferably is capable of generating an integer of the cyclic group $Z/qZ$ from two strings of binary digits. The fourth function $H_4$ preferably is capable of generating one binary string from another binary string.

The Encryption algorithm begins with block 930a, which shows the selection of a random binary string σ. The random binary string σ is then used to generate a random integer $r=H_3(\sigma, M)$, as shown in block 930b. W is a symmetric encryption of the actual message M preferably generated using a symmetric encryption algorithm E, and using $H_4(\sigma)$ as the encryption key. Accordingly, $W=E_{H_4(\sigma)}(M)$. In block 930c, the ciphertext $C=[U_0, U_2, \ldots, U_{n+1}, V, W]$ is generated. The ciphertext C includes elements $U_0=rP_0$, and $U_i=rP_{zi}$ for $2 \leq i \leq n+1$, which relate to the recipient's public key and the location of the recipient in the hierarchy. The second part of the ciphertext C is the random binary string σ in encrypted form, $V=\sigma \oplus H_2(g^r)$, wherein $g=\hat{e}(Q_0, P_{z1})$. The element g preferably is a member of the second cyclic group $G_2$. The third part of the ciphertext C is the actual message in encrypted form, as described above.

The Decryption algorithm begins with block 932a, which shows the recovery of the random binary string σ. The random binary string σ is recovered using the formula $$\sigma = V \oplus H_2\left(\frac{\hat{e}(U_0, S_{z(n+1)})}{\prod_{i=2}^{n+1} \hat{e}(Q_{i-1}, U_i)}\right).$$

The message M is then recovered from the ciphertext C (block 932b) using the formula $M=E_{H_4(\sigma)}^{-1}(W)$. The ciphertext optionally may be checked for internal consistency. For instance, an experimental random integer $r'=H_3(\sigma, M)$ may be generated, as shown in block 932c. The experimental random integer r' then may be used in block 932d to confirm that $U_0=r'P_0$ and $U_i=r'P_{zi}$ for $2 \leq i \leq n+1$. If so, then the ciphertext C is considered authentic.

The concept of dual-HCBE described with reference to FIGS. 5 and 6 may be applied to BasicHCBE and FullHCBE schemes. When both the sender and recipient are within the hierarchical structure, as shown in FIG. 6, dual-HCBE allows them to increase the efficiency and security of their encrypted communications. The application of dual-HCBE to BasicHCBE and FullHCBE schemes requires the determination of additional information, most of which is determined via the Lower-level Setup algorithm described above. For instance, elements $P_{yi}$, lower-level key generation secrets $S_{yi}$, lower-level secret elements $S_{yi}$, and lower-level key generation parameters $Q_{yi}$ must be determined for the sender's m ancestral lower-level authorizers. Note, however, that for the lower-level authorizers that are common ancestors to both the sendery and the recipient z, these parameters preferably will be the same for purposes of analyzing both the sendery and the recipient z (i.e., for all $i \leq l$: $P_{yi}=P_{zi}$, $s_{yi}=s_{zi}$, $S_{yi}=S_{zi}$, and $Q_{yi}=Q_{zi}$) Dual-HCBE also requires determination of a sender public element $P_{y(n+1)}$ and a sender secret element $S_{y(m+1)}$ for the sender, using the same methods for which these parameters are determined for the recipient as described above.

Given these additional parameters, a message M may be encoded to generate a ciphertext C according the principles of dual-HCBE by using the lower-level key generation parameters $Q_{yi}$ for $i \geq l$ and the sender secret element $S_{y(m+1)}$, but not using the lower-level key generation parameters $Q_{yi}$ for $i \leq l$. Similarly, the ciphertext C may be decoded to recover the message M using the lower-level key generation parameters $Q_{zi}$ for $i \geq l$ and the recipient secret element $S_{z(n+1)}$ but not using the lower-level key generation parameters $Q_{zi}$ for $i < l$.

For instance, in a BasicHCBE scheme (FIGS. 7 and 8), application of dual-HCBE changes the encoding of the message M to generate a ciphertext $C=[U_0, U_{l+1}, \ldots, U_{n+1}, V]$, wherein $U_0=rP$, and $U_i=rP_{zi}$ for $2 \leq i \leq n+1$, wherein $V=M \oplus H_2(g^r_{yl})$, and wherein $$g_{yl} = \frac{\hat{e}(P_0, S_{y(m+1)})}{\prod_{i=l+1}^{m+1} \hat{e}(Q_{y(i-1)}, P_{yi})}.$$

The $U_i$ factors are calculated in the same way as before, but fewer of them are necessary. However, dual-BasicHCBE does require the sender y to use more key generation parameters $Q_{yi}$ to generate $g_{yi}$ than are necessary to generate g as describe above. This is because the Encryption algorithm incorporates the sender's identity.

The increase in efficiency of the Decryption algorithm is more dramatic. The message M is recovered using $$M = V \oplus H_2\left(\frac{\hat{e}(U_0, S_{z(n+1)})}{\prod_{i=l+2}^{n+1} \hat{e}(Q_{z(i-1)}, U_{zi})}\right).$$

Again, fewer $U_i$ parameters are necessary. Similarly, the recipient requires fewer key generation parameters $Q_{zi}$ for dual-HCBE than would otherwise be necessary.

FullHCBE also may be modified to create a dual-FullHCBE scheme. Generation of the ciphertext C in the Encryption algorithm is modified such that $C=[U_0, U_{l+1}, \ldots, U_{n+1}, V, W]$, wherein $U_0=rP$, and $U_1=rP_{zi}$ for $k+1 \leq i \leq n+1$. The W and r parameters are still generated the same way, $W=E_{H_4(\sigma)}(M)$, but the $g_{yl}$ parameter in $V=\sigma \oplus H_2(g_{yl}^r)$ is generated using $$g_{yl} = \frac{\hat{e}(P_0, S_{y(m+1)})}{\prod_{i=l+1}^{m+1} \hat{e}(Q_{y(i-1)}, P_{yi})}.$$

The Decryption algorithm also is modified in a dual-FullHCBE scheme. The random binary string σ is recovered using $$\sigma = V \oplus H_2\left(\frac{\hat{e}(U_0, S_{z(n+1)})}{\prod_{i=l+1}^{n+1} \hat{e}(Q_{z(i-1)}, U_{zi})}\right).$$

Otherwise, recovery of the message M does not change.

Aggregate Signature CBE

In another embodiment of the present invention, a scheme may be used to compress signatures on any type of information in an authorization chain to a single point, i.e. given n signatures on n distinct messages from n distinct users, it is possible to aggregate all these signatures into a single short signature. D. Boneh, C. Gentry and B. Lynn and H. Shacham, *Aggregate and Verifiably Encrypted Signatures from Bilinear Maps*, eprint archive, 2002, available at h-t-t-p://eprint.iacr.org/2002/175/ describe a bandwidth-efficient aggregate signature scheme in which multiple signatures by multiple signers on multiple documents may be compactly represented as a single point on an elliptic curve.

In such an aggregate-signature-based CBE protocol, the recipient can only decrypt an encrypted message if it possesses the signatures generated by the authorizers, in addition to the recipient's private key, $SK_B$. Here, the public key of each required signer (an element of $G_1$) is readily available to users of the cryptosystem, as are a point P on the elliptic curve and a function H that maps messages to points on the elliptic curve.

In one embodiment of aggregate signature CBE, the ith signer chooses $s_i$ as its private key and computes $s_iP$ as its public key. The ith signer then signs a document $M_i$ by computing $P_{Mi}=H(M_i)$ and sends its signature $S_i=s_iP_{Mi}$ to the recipient. Any entity, including the verifier, can verify that $S_i$ is a legitimate signature by the $i^{th}$ signer by checking that $\hat{e}(P, S_i) = \hat{e}(s_i P, P_{Mi})$. Any entity can also aggregate the signatures by summing them up. Any entity that knows the aggregate signature $S_i$ the public keys of the signers, and the respective documents being signed can verify that the aggregate signature is legitimate by checking that $\hat{e}(P, S) = \Pi^n_{i=1} \hat{e}(s_i P, P_{Mi})$.

The message sender encrypts its message so that the message recipient needs the recipient private key and a specified aggregate signature in order to decrypt. Using the message recipient's public key, the public keys of the specified signers, and the specified documents to be signed, the message sender encrypts a message M by setting the ciphertext to be:

$$C = [rP, M \oplus H_2(g^r)], \text{ where } g = \hat{e}(s_B P, P'_B) \Pi^n_{i=1} e(s_i P, P_{mi}) \text{ and where } P'_B = H_1(\text{Infrec}).$$

The message recipient computes $g^r = \hat{e}(rP, S)$, which allows recovery of the message M.

The document $M_i$ may comprise any type of digital information and one of more of the authorizers may sign different documents. In one embodiment of the invention, a document $M_i$ includes the validity period for the recipient's public key and can include other identifying information, including the recipient's public key. In this embodiment, the recipient can decrypt only if the aggregate signature includes the ith signer's signature on $M_i$ attesting that the recipient's public key is valid for period i.

In another embodiment of the invention, the authorizers form an aggregate signature hierarchy including at least a root authorizer and n lower-level authorizers in the hierarchy between the root authorizers and the entity, wherein $n \geq 1$. For example, the recipient may be at level t in the hierarchy with authorizers above having public keys $s_K P$ for $0 \leq k \leq t-1$. Each authorizer certifies the public key of the authorizer below it, producing $s_K P_{k+1}$ for $0 \leq k \leq t-2$, where $P_{k+1} = H_1(CA_{k+1}\text{name}, s_{K+1}P)$. Here, $CA_{k+1}$name is the identifying information for the authorizer at level k+1. The authorizer at level t−1 certifies the recipient, producing $s_{t-1} P_B$, where $P_B = H_1(\text{Recipient}_{name}, s_B P, i)$. Here, recipient$_{name}$ is the recipient's identifying information, $s_B P$ is the recipient's public key, and i is a parameter determining the validity period of the recipient's public key. To encrypt M, the sender chooses a random $r \in Z/qZ$ and creates ciphertext $C = [rs_B P, M \oplus H_2(g^r)]$, where $g = \Pi^n_{i=1} \hat{e}(P_K, s_{K-1}P)$. To decrypt, the recipient is assumed to have possession of the aggregate of the t certificates $S_B = s_{t-1} P_B + \Sigma^{t-1}_{k=1} s_{k-1} P_k$. The recipient computes $s_B^{-1} S_B$ and then decrypts $M = V \oplus H_2(\hat{e}(rs_B P, s_B^{-1} S_B))$.

Here, encryption involves t pairing computations. However, decryption time and the ciphertext length are the same as Boneh-Franklin. This method offers advantages over the hierarchical schemes described above there the length of the ciphertext is basically proportional to t.

As in the schemes mentioned above, aggregate signature CBE may be made chosen-ciphertext secure in the random oracle model using the Fujisaki-Okamoto transform.

CBE Using General Pairing-Based Signatures

The description above discusses different pairing-based embodiments of CBE in which the recipient decryption key is a pairing-based signature. For example, in the simplest version of pairing-based CBE, the recipient decryption key is a single element of $G_1$ that is a single authorizer's signature on a single document. In the pairing-based embodiments of HCBE and dual-HCBE, the recipient decryption key is a hierarchical identity-based signature on a single document consisting of a plurality of elements of $G_1$. In the pairing-based embodiment of aggregate signature CBE, the recipient decryption key represents multiple signatures by multiple signers on multiple documents that may be aggregated into a single element of G1. In general, the verification algorithm in these signature schemes works by confirming that a product of pairings of public key points and message points—e.g., $s_i P$ and $P_{Mi}$ for aggregate signatures—equals a product of pairings of signature points and dummy points—e.g., $s_i P_{Mi}$ and P for aggregate signatures. In another embodiment of the present invention, any pairing-based signature scheme may be used to construct a pairing-based CBE scheme, where a pairing-based signature scheme is defined herein to be one in which the verification algorithm works by confirming that a product of pairings of the public key points and message points equals a product of pairings of the signature points and dummy points.

For example, suppose that the verification algorithm confirms that $\Pi^n_{i=1} e(Q_i, P_{Mi}) = \Pi^n_{i=1} (S_i, D_i)$, where the Q's are public key points, the P's are message points, the S's are signature points, and the D's are decryption points, not necessarily distinct. If the signature scheme is secure, a secure pairing-based CBE scheme may be constructed. The sender chooses a random $r \in Z/qZ$ and creates ciphertext $C = [rD_0, rD_1, \ldots rD_n, M \oplus H_2(g^r)]$, where $g = e(s_B D_0, P'_B) \Pi^n_{i=1} e(Q_i, P_{Mi})$. If the message recipient possesses all of the signature points—i.e., all of the necessary authorizations, it may compute $g^r = e(rD_0, s_B P'_B) \Pi^n_{i=1} (S_i, rD_i)$, and hence M. As previously, the scheme can be made chosen-ciphertext secure in the random oracle model using the Fujisaki-Okamoto transform.

High-Granularity CBE

Another embodiment of the invention combines a CBE scheme with a forward-secure encryption scheme operated in reverse to produce a high-granularity CBE scheme.

In a conventional forward-secure encryption scheme, the lifetime of the system is divided into a number of time-periods, each defining a key validity period. This period is equivalent to the validity period of the identity-based decryption key in a CBE system. In the forward-secure system, the private key changes during successive time periods in such a way that, if the key is compromised, an attacker cannot decrypt messages sent to the recipient in previous time periods. However, if the sender continues to use the key after compromise, the attacker can decrypt messages sent in subsequent time periods. J. Katz, *A Forward-Secure Public-Key Encryption Scheme*, eprint archive, 2002, available at h-t-t-p://eprint.iacr.org/2002/060/, the contents of which are incorporated by this reference, describes such a forward-secure scheme. The security of the Katz scheme is based on the bilinear Diffie-Hellman assumption in the random oracle model and may be extended to achieve chosen-ciphertext security.

In a high-granularity CBE scheme of the present invention, the authorizer uses a forward-secure system operated in reverse to issue a recipient identity-based decryption key that can be used to decrypt messages encrypted using a time period parameter set at or before a specific time but not messages encrypted with a time parameter set at a later time.

In a conventional CBE scheme, the authorizer must issue an identity-based decryption key to each potential message recipient for every time period used during encryption. If the authorizer is to be able to respond quickly to situations in which a key is compromised, the key must be valid for only a short time period. For example, the authorizer may be required to issue a key having a validity period of one minute, requiring the authorizer to issue a new key to each user every minute. Transmitting such a large number of keys for all users requires considerable resources.

In the high-granularity authorized decryption scheme, the forward-secure scheme allows the recipient to request a key update only when a recipient wishes to initiate a session of reading encrypted messages. If the recipient has only four message reading sessions per day—e.g., it logs into its email accounts only once every few hours—only four keys are required, regardless of how many actual messages the message recipient decrypts. Each key will allow the recipient to decrypt all messages encrypted using a time parameter set earlier than or at the time it requests the key but not messages encrypted with a parameter indicating a later time. High-granularity CBE reduces transmission costs by reducing the number of identity-based decryption keys transmitted by the authorizer. The scheme offers various tradeoffs compared to an online scheme or a conventional high-granularity scheme.

In an online scheme, the authorizer collaborates with the recipient on each message decryption. Thus, in comparing an online approach with a high-granularity CBE scheme, the most important metric is how many messages a recipient expects to decrypt per session. A large number of messages per session favors the high-granularity CBE protocol, at least in terms of minimizing the burden on the authorizer.

A conventional approach incorporating high time granularity requires the message sender to perform an online check of the recipient's key status before sending a message. Again, a high number of messages per session favors the high-granularity CBE protocol over the conventional approach, since, in this case, the sender must perform an operation for each message.

Where key updates occur at a high frequency, a high-granularity CBE scheme allows a recipient to download identity-based decryption key information only when the recipient wishes to initiate a session of reading messages. The downloaded information allows the decryption of messages encrypted using a time parameter up to the current time-period, but not messages encrypted using a time parameter for a later time-period. Since the authorizer does not need to compute and transmit a separate identity-based decryption key for each time-period that has transpired, this decreases the workload on the authorizer compared to a conventional CBE scheme. The size of the download can be further reduced by downloading only the information required to compute keys for the time-period since the previous download. (However, the fact that that recipients "pull" certificates from the authorizer, whereas the authorizer may "push" certificates to recipients in a conventional CBE scheme, may introduce some additional workload on the authorizer.)

If desired, it is possible to combine a high-granularity CBE protocol with a hierarchical certification scheme to avoid burdening a single authorizer with key-issuing responsibilities for an entire network.

FIG; 10 shows a diagram illustrating one embodiment of a high-granularity CBE scheme. Here, the lifetime of the scheme is divided into a number of time periods t. For example, since there are approximately $2^{11}$ minutes in a day, an 11-bit binary string $b_1 \ldots b_{11}$ may be assigned to each minute. Each binary string defines a time-period identification parameter representing the "identity" of a specific time minute. If the system lifetime is longer than one day, each day forms a portion of the system lifetime. A time portion identifying parameter that specifies the date (the "identity" of the day) may be specified separately. Alternatively, the identity of the recipient may also specify the date.

Figure 10:
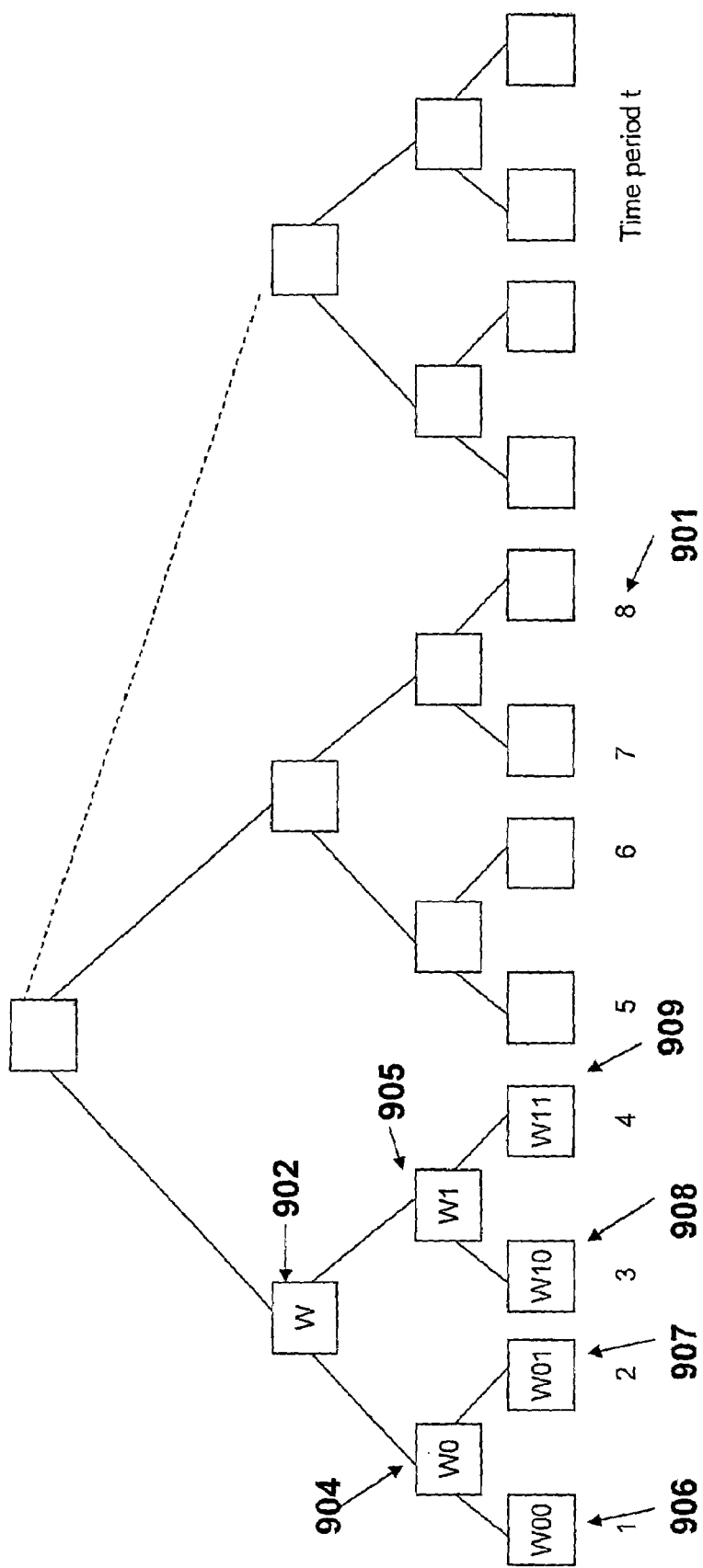
FIG. 10 shows a diagram illustrating a High-Granularity Encryption Scheme.

FIG. 10 illustrates one embodiment of a high-granularity CBE protocol. In FIG. 10, the successive time-periods 901 are represented by the leafs of a binary tree of height t. Here, successive time-periods are associated with the leaves of the tree, which are labeled with strings <i> of length t, i.e. time period i is associated with the leaf labeled by <i>.

Each node w 902 of the tree, including the leaf nodes are assigned a secret key $sk_w$ by the authorizer. To decrypt a message encrypted using PK during period i, only key $ski_{<i>}$ is needed. In addition, given key $sk_w$, it is possible to efficiently derive descendant keys $sk_{w0}$ and $sk_{w1}$ for descendant nodes $w_0$ 904 and $w_1$ 905 and the descendants derived of these nodes. However, given PK and i, and without $sk_w$ for all prefixes w of <i>, it is infeasible to derive $s_{ki<i>}$ or to decrypt messages encrypted during time-periods up to including i.

For example, if the authorizer wishes to allow the recipient to decrypt messages during time periods 1-3 but not messages send during subsequent time periods, the authorizer will give the recipient the keys associated with node w0 904 and w10 908. The recipient can generate the keys associated with time-periods 1-2, i.e. w00 906 and w01 907, from key w0 904 and has the key for time period 3, i.e. w10 908. However, the recipient cannot decrypt messages during time period 4 909 or subsequent time periods.

In one embodiment of the invention, a pairing-based high-granularity CBE scheme includes four randomized algorithms: setup, key generation and certification, encryption, and decryption.

During setup, the authorizer uses IG, a BDH parameter generator, and a security parameter k to generate groups $G_1$ and $G_2$ of some prime order q and an admissible pairing ê: $G_1 \times G_1 \rightarrow G_2$ as is described in the above CBE schemes. Again, the pairing is admissible if it is bilinear, non-degenerate and computable.

The authorizer selects a key generation secret and establishes system parameters by choosing an arbitrary generator P $\in G_1$, picking a random $s_c \in Z/qZ$, setting $Q=s_cP$, and choosing cryptographic functions $H_1: \{0,1\}^* \rightarrow G_1$ and $H_2: G_2 \rightarrow \{0,1\}^n$ for some n. Here, the message space is $M=\{0,1\}^n$, the system parameters are params=$(G_1, G_2, ê, P, Q, H_1, H_2)$, and the authorizer's master key generation secret is $s_c \in Z/qZ$.

In the key generation and certification algorithm, the authorizer then generates the recipient's identity-based decryption key. The key $SK_i$ for time period i will consist of $sk_{<i>}$ and $\{sk_{<i0 \ldots ik-i0>}\}$ for all $1 \leq k \leq t$ such that $i_k=1$, i.e. the secret keys for all time periods up to and including time period i. Here, $SK_j$ is computable from $SK_i$ when $j \leq i$.

When a user requests $SK_i$ from the authorizer, the authorizer chooses random $x \in Z/qZ$. For w=<i> and for all w=$i_0 \ldots i_{k-1}0$ with $1 \leq k \leq t$ such that $i_k=1$, it computes $S_w=s_cH_1(i_0, \text{Inf}_z)+xH_1(w)$ and sets $sk_w=\{xP, S_w\}$. It sends these $sk_w$ to the recipient.

In the encryption algorithm, the sender selects a random r and encrypts a message to form a ciphertext C by setting the ciphertext to:

$$C=[rs_BP, rH_1(j_0 j_1), \ldots, rH_1(j_0 \ldots j_t), M \oplus H_2(g^r)],$$

where $s_BP$ is the recipient's public key, j is a time period chosen by the sender, and $g=e(Q, H_1(i_0, \text{Inf}_z))$.

In the decryption algorithm, a recipient possessing $SK_i$ for $j \leq i$ knows $sk_w$ for some w that is a prefix of j—i.e., some w=$j_0 \ldots j_k$ for some $k \leq t$. Using this $sk_w$, it decrypts C=[$U_0$, U1, \ldots, $U_t$, V] by computing:

$$g^r = e(U_0, s_B^{-1}S_w)/e(xP, U_k),$$

and then $M=V \oplus H_2(g^r)$.

Combining Certification Reconfirmation and CBE

The CBE schemes discussed require that the authorizer sign each recipient's decryption key individually. For example, if a system has 250 million users and the time granularity is one day and each user receives a decryption key for each time-period, the authorizer would have to generate and transmit 250 million identity-based signatures per day.

A good PKI proposal must balance cryptographic and algorithmic considerations with real world technological limitations. In terms of efficiency, two important factors are the amount of computation performed by each type of entity (e.g. the authorizer) and the communication costs between the entities. Other embodiments of the present invention provide for computationally efficient techniques for the authorizer to issue new decryption keys to users of the system.

A CBE scheme that amortizes public key operations over multiple users offers advantages in terms of efficiency. In a CBE scheme, the certificates issued by the authorizer must also serve as decryption keys in a public-key encryption scheme. These decryption keys must be computed using public key operations. However, by using efficient data structures, like B-trees, the authorizer need not necessarily perform O(N) public key operations per day, despite having N clients.

In one embodiment of the present invention, each client of the authorizer is assigned a long-lived (e.g., one-year) certificate, which the authorizer periodically "reconfirms" (e.g., every day). The long-lived certificate may be generated in a number of ways. For example, it could be created using a scheme similar to that described above. In any case, if the message sender has the message recipient's long-lived certificate, the sender can use CBE to protect against the possibility that the recipient's public key has been revoked before its intended date of expiration.

Figure 11:
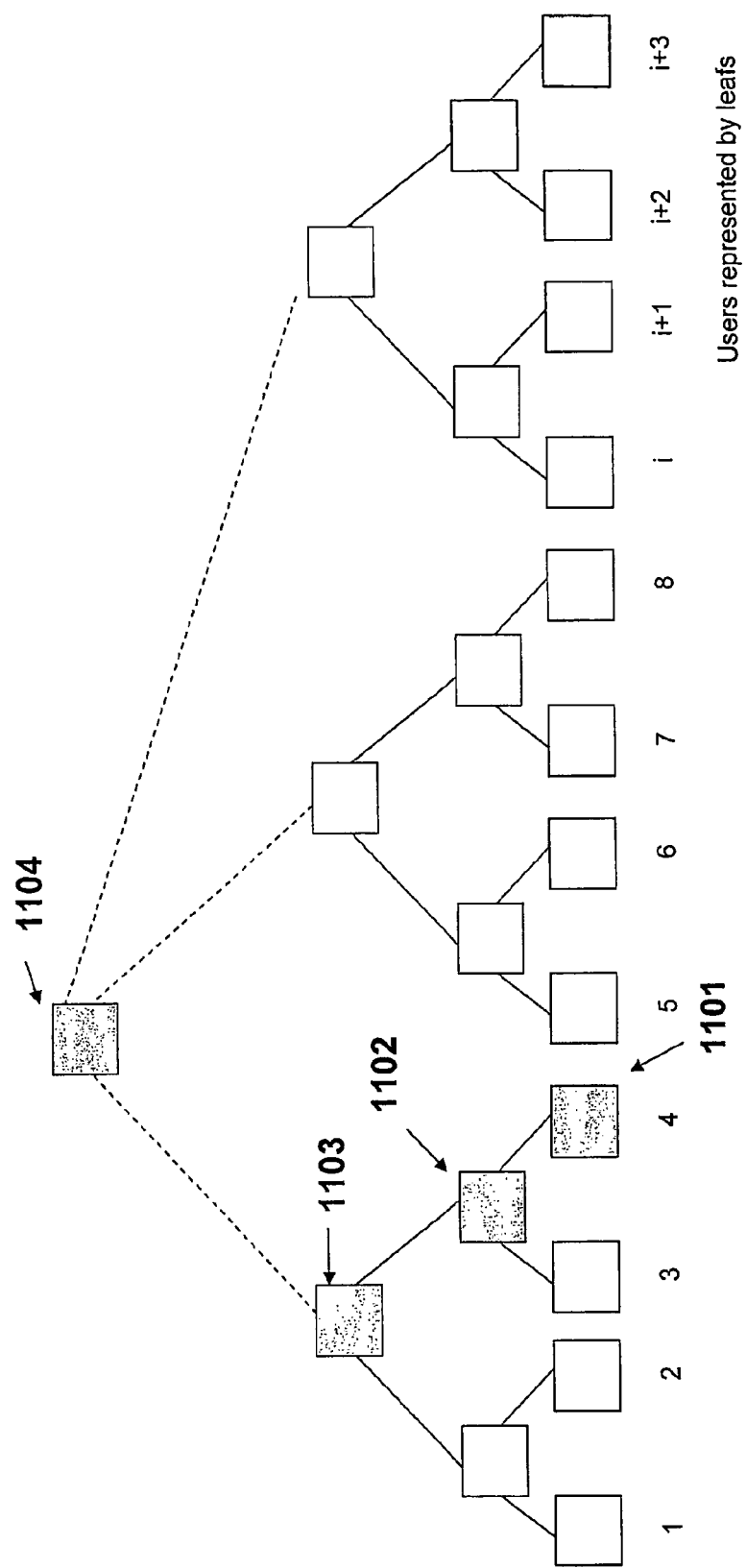
FIG. 11 shows a flow diagram illustrating a broadcast encryption scheme using a binary tree.

In cryptography, there is a broadcast encryption technique using the leafs of binary trees to represent the N users in a system. Here, a user's m=log N secret keys are the secret keys of the m nodes that are the leaf's ancestors (including the leaf itself). FIG. 11 illustrates such a system. Here, if user 4 is authorized to the broadcast, the authorizer encrypts the session broadcast key with the secret key of one of its m ancestors 1101, 1102, 1103 ... 1104. If user 4 is not entitled to the broadcast, the m secret keys corresponding to nodes that "hang off" the path from the root to this leaf are used instead.

When R users are not entitled to the broadcast, the session broadcast key is encrypted using Rlog(N/R) node keys, where these nodes form a "cover" of the N−R entitled users. FIG. 12 illustrates the concept of "cover". Here, the keys associated with nodes 1201 provide cover for users 1, 3, 4, 5, 6, 7, 8, i, and i+1 but not the other users.

One embodiment of a CBE scheme applies this technique. A unique binary string is generated associating the recipient with a leaf node in a B-tree. Unique binary strings associated with each ancestor node of the recipient leaf node are also generated. In the present pairing-based embodiment, the authorizer establishes some public way of associating the binary strings to points $P_{node}$ on the relevant elliptic curve (or abelian variety).

These binary strings may be generated in a number of ways. For example, the authorizer may compute a node's binary string as function(stringparent, O) or function(stringparent, 1), depending on whether the node is the left or right child of its parent. Alternatively, binary strings can be assigned to each recipient leaf node and the binary strings associated with ancestor generated using at least the binary strings associated with the child nodes of these nodes. Each binary string can then be mapped to a point on an elliptic curve or abelian variety using a function. In one embodiment, the function may be a hash function.

The decryption key corresponding to a node's point $P_{node}$, is $s_c P_{node}$, where $s_c$ is a master secret kept by the authorizer. The authorizer finds a cover of the users to be reconfirmed, and then periodically publishes the decryption keys corresponding to the nodes in that cover. Every reconfirmed user can find some decryption key $s_c P_{node}$, such that node is an ancestor of its leaf. This decryption key may also be associated with a parameter establishing a validity period for the decryption key. For example, $P_{node}$ may depend on this parameter.

If the point $P_{node}$ associated with the decryption key $s_c P_{node}$ are known to the sender, the sender can encrypt a message to the recipient using the recipient's public key $PK_B$ and an encryption key forming a public key/private key pair with the decryption key.

However, since the sender may not know the cover used by the authorizer, the sender may not know which of the recipient's ancestor nodes this decryption key corresponds to. Thus, the sender generates m separate encryptions of the message.

The sender chooses a random r and computes rP. Next the sender encrypts the ciphertext C=[rP, $V_1, \ldots, V_m$], where $V_i = M \oplus H\,(\hat{e}(P, P_j)^{rs}_c)$ and $P_i$ is the identifying string corresponding to serial number $b_1 \ldots b_i$. Some part of the ciphertext, e.g., M, is also encrypted with the recipient's public key $PK_B$. This could be done in a fashion similar to the schemes above, where the recipient uses its knowledge of $s_B$ to compute $s_B P'_B$, which it needs to decrypt.

An unrevoked recipient will have received some decryption key $s_c P_i$ from the authorizer. The recipient uses this key, as well as the recipient's private key $SK_B$, to decrypt one of the $V_i$'s.

If the decryption key is associated with a validity period parameter, a message sender knowing the schedule by which the authorizer issues the recipient's decryption key can encrypt a message using the recipient's public key $PK_B$ and an encryption key forming a public key/private key pair with the decryption key with a defined validity period. The recipient may then only decrypt the message during this period.

In another embodiment of the present invention, only the root node point $P_{time}$ is computed as a function of the period validity parameter. The lower-level nodes, i.e. those nodes between the root node and the leaf representing a recipient, are computed as functions of their positions in the tree, e.g., $P_{b_1 \ldots bi} = H(b_1 \ldots b_i)$, and do not change with time. The authorizer uses the technique described above to generate a decryption key for some ancestor of each leaf associated with a recipient that is not revoked. The decryption key for $b_1 \ldots b_i$ is of the form $s_c P_{time} + x(P_{b_1 \ldots bi})$, xP for some random $x \in Z/q$. Here, both $s_c$ and x are secrets of the authorizer.

As compared to the previous embodiment, the authorizer's computational load in computing these keys is not increased. However, the sender's encryption time is reduced. To encrypt, the sender chooses a random r and computes rP. The sender then encrypts the ciphertext C:

$$C = [rP, rP_{b1}, \ldots, r(P_{b1} + \ldots + P_{b1 \ldots bm}), V], \text{ where}$$
$$V = M \oplus H_2(\hat{e}(s_c P, P_{time})^r)), \hat{e}(P, P_{time}) \in G_2.$$

Again, some part of the ciphertext, e.g., M, is also encrypted with the recipient's public key $PK_B$.

An unrevoked recipient decrypts by dividing $\hat{e}(rP, sP_{time} + X((P_{b1} + \ldots + P_{b1 \ldots bi}))$ by $\hat{e}(xP, r(P_{b1} + \ldots + P_{b1 \ldots bi}))$. The recipient also uses the recipient's private key $SK_B$, to decrypt the message. Here, the recipient has to perform one more pairing than the previous embodiment. However, the sender performs fast point multiplications rather than slower pairing computations.

In yet another embodiment of the present invention, only the root node point $P_{time}$ is computed as a function of a certain specified time-period, as above. However, in this embodiment, the amount of work performed in a given time period by the authorizer depends only on the number of revocations that occurred during the previous time-period, rather than the total number of revoked recipients.

The lower-level nodes are again computed as functions of their positions in the tree, e.g., $P_{b1\ldots bi}=H(b_1\ldots b_i)$, and do not change according to time. The authorizer generates a decryption key for some ancestor of each unrevoked recipient.

If the authorizer performs decryption key updates at given time intervals, e.g. every hour, the each hour has a point $P_{hour}$ associated with it. The authorizer finds a cover of the recipients that have not been revoked in the past hour, using the broadcast encryption technique. This cover will consist of $O(R \log(N/R))$ points, where R is the number of recipients revoked in the past hour (not overall). For each node $P_i$ in the cover, the authorizer issues a point of the form $sP_{hour}+xP_i$, along with the point xP. The authorizer chooses a new value of x for each hour. If a given recipient has not been revoked in that hour, the recipient will have some ancestor $P_i$ for which the authorizer has issued a point. This point is the recipient's reconfirmation certificate for that hour.

By adding its hourly reconfirmation certificates together, a recipient obtains an aggregated certificate of the form $s(P_{hour1}+\ldots+P_{hourk})+x_1P_1+x_2P_2+\ldots+x_mP_m$, together with the points $\{x_i,P\}$. This is the recipient's updated decryption key. At the end of a chosen time interval, e.g. at the end of the day, the authorizer publishes $s(P_{day}-P_{24}-\ldots-P_1)$. This allows all recipients that were certified throughout the day to compress the expression of the time component of their private point. A recipient's complete private point from day v hour y to day w hour z may look like:

$$S_{recipient}=s(P_{v,y}+\ldots+P_{v,24}+P_{v+1,1}+\ldots+P_{w,z})+x_1P_1+x_2P_2+\ldots+x_mP_m.$$

The message sender can easily compute $P_{Bper}=P_{v,y}+\ldots+P_{w,z}$, the point corresponding to the time period over which a recipient must have been continuously reconfirmed. The sender encrypts a message to the recipient by first choosing a random r and then computing rP. The sender then sets the ciphertext C to be:

$$C=[rP,rP_1,\ldots,rP_m,V], \text{ where } V=M\oplus H(\hat{e}(s_cP,P_{Bper})^{rs}).$$

Again, some part of the ciphertext, e.g., M, is also encrypted with recipient's public key $PK_B$.

The recipient, if not revoked, decrypts to recover M via the formula:

$$M = V \oplus H\left(\hat{e}(rP, S_{recipient})\bigg/\prod_{i=1}^{m}\hat{e}(rP_i, x_iP)\right)$$

The recipient also uses the recipient private key $SK_B$ to perform some part of the decryption The advantages of the later embodiment may be illustrated by the following example in which the authorizer has N=250,000,000 clients, performs updates every hour, and revokes R users per hour. In a system of 250,000,000 users, 10% of which are revoked per year, about 2850 users are revoked per hour. Since R log(N/R)~46000, the authorizer must generate about 13 reconfirmation certificates per second. This is quite reasonable on a single computer. However, the CA can have several computers to allow the computation to be distributed. Signature generation merely involves point multiplication on elliptic curves, which is fast ECC-type operation.

Distributing these certificates can be handled in a number of different ways. One option is to "push" certificates to the recipients they certify. Potentially, multicast could make this very efficient, reducing the authorizer's bandwidth needs to (46000 certs)*(320 bits per certification)/hour=4 kbits/sec. If multicast is not used, pushing certificates directly to all 250,000,000 users would require the CA to have a at least 22 tobit/sec connection, which, since it is a lower bound, may be infeasible. This figure might be reduced if clients "pull" their certificates from the CA less than 24 times per day, but the bandwidth requirements would still be substantial. If multiple (untrusted) servers are used, a (collective) 22 mbit/sec connection will allow the servers to push certificates to clients.

As an alternative, the clients could pull their certificates from the servers. It is not necessary for every server to store all of the reconfirmation certificates. Rather, the recipient can have a certain server that it always retrieves its certificates from. In this case, the authorizer-directory communication is not (4 kbits/sec)*(number of servers); rather it remains 4 kbits/sec.

Regardless of the number of time periods that have passed from a recipient's initial certification to the present, the recipient's proof of certification remains compact: its private point $S_{recipient}$ together with its log N points $\{x_iP\}$. At a small additional expense to the sender, the recipient can express each point using about 160 bits (instead of 320 bits). Thus, if N is 250,000,000, its aggregated reconfirmation certificate is about 4.5 kbits.

Although the methods of the present invention all preferably require the recipient to have its own public key/private key pair so that only the recipient (or possibly a private key generator, if the recipient private key is identity-based) can decrypt, it will be understood by those skilled in the art that the methods can be weakened by not making such a requirement—i.e., by allowing the sender's message to be decrypted by any entity possessing the necessary signatures from the necessary authorizers even without a recipient private key.

Systems for Use with Certificate-Based Encryption Schemes

Various methods of sending a digital message between a sender and a recipient in a public-key encryption scheme have been described. A system for implementing these methods according to another embodiment of the present invention will now be described.

The system includes a number of terminals, each of which may be associated with an entity that sends or receives messages according to the methods described above. The system also includes one or more authorizers that certify that a message recipient has authority to receive a message.

Each terminal includes a processor in bidirectional communication with a memory. The processor executes suitable program code for carrying out the procedures described above. The processor also executes suitable program code for generating information to be transmitted to other terminals. Suitable program code may be created according to methods known in the art. The memory stores the program code, as well as intermediate results and other information used during execution of the methods described above.

A communications network is provided over which the entities and the authorizer(s) may communicate. The communications network may be of various common forms, including, for instance, a LAN computer network, a WAN computer network, and/or a mobile telephone network provide suitable communication networks.

The invention has been described in detail with particular reference to preferred embodiments thereof and illustrative examples, but it will be understood that variations and modifications can be effected within the spirit and scope of the invention.

I claim:

1. A method for operating a public-key encryption scheme which provides for sending a digital message M between a sender and a recipient with participation of an authorizer, wherein the digital message is encrypted by the sender and decrypted by the recipient, the method comprising encrypting, by at least one machine in a set of one or more machines, the digital message M using at least a recipient public key RPUB and a recipient encryption key RENC to create an encrypted digital message for decryption with a recipient private key RPRIV and a recipient decryption key RDEC, wherein:

the recipient public key RPUB and the recipient private key RPRIV form a public key/private key pair 1, wherein the recipient private key RPRIV is a secret of the recipient;

the recipient decryption key RDEC is generated using at least a key generation secret of the authorizer and the recipient encryption key RENC, wherein a key formed from the recipient encryption key RENC and a key formed from the recipient decryption key RDEC are a public key/private key pair 2;

wherein the recipient decryption key RDEC is generated by the authorizer to have a value $S=s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q=s_c P$;

a second function $H_2$ capable of generating a second string of binary digits from an element of the second cyclic group $G_2$, wherein $Inf_B$ comprises the identity of the recipient, $ID_{rec}$, the recipient public key RPUB, and a parameter defining a validity period for the recipient decryption key RDEC.

2. The method of claim 1, wherein the recipient encryption key RENC is generated from information comprising the identity of the recipient.

3. The method of claim 1, wherein the recipient encryption RENC key is generated from information comprising a parameter defining a validity period for the recipient decryption key RDEC.

4. The method of claim 1, wherein the recipient encryption key RENC is generated from information comprising the recipient public key RPUB.

5. The method of claim 1, wherein the recipient encryption key RENC is generated from information comprising the identity of the recipient, the recipient public key RPUB, and a parameter defining a validity period for the recipient decryption key RDEC.

6. The method of claim 1, wherein the recipient decryption key RDEC is generated by the authorizer according to a schedule known to the sender.

7. The method of claim 6, wherein the recipient encryption key RENC is generated using at least information comprising the schedule.

8. The method of claim 1, wherein the recipient private key RPRIV and the recipient public key RPUB are generated using at least one system parameter issued by the authorizer.

9. The method of claim 1, wherein both the first group $G_1$ and the second group $G_2$ are of the same prime order q.

10. The method of claim 1, wherein the first cyclic group $G_1$ is an additive group of points on a supersingular elliptic curve or abelian variety, and the second cyclic group $G_2$ is a multiplicative subgroup of a finite field.

11. The method of claim 1 wherein the system parameters available to the sender further comprise a function ê which is a bilinear, non-degenerate, and efficiently computable pairing which maps $G_1 \times G_1$ into $G_2$.

12. The method of claim 9 wherein:

$s_c$ is an element of the cyclic group Z/qZ.

13. A method for operating a public-key encryption scheme which provides for sending a digital message M between a sender and a recipient with participation of an authorizer, wherein the digital message is encrypted by the sender and decrypted by the recipient, the method comprising encrypting, by at least one machine in a set of one or more machines, the digital message M using at least a recipient public key RPUB and a recipient encryption key RENC to create an encrypted digital message for decryption with a recipient private key RPRIV and a recipient decryption key RDEC, wherein:

the recipient public key RPUB and the recipient private key RPRIV form a public key/private key pair 1, wherein the recipient private key RPRIV is a secret of the recipient;

the recipient decryption key RDEC is generated using at least a key generation secret of the authorizer and the recipient encryption key RENC, wherein a key formed from the recipient encryption key RENC and a key formed from the recipient decryption key RDEC are a public key/private key pair 2;

wherein the recipient decryption key RDEC is generated by the authorizer to have a value $S=s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q=s_c P$;

a second function $H_2$ capable of generating a second string of binary digits from an element of the second cyclic group $G_2$;

wherein encrypting the digital message M comprises:

generating an element $P'_B=H_1(ID_{rec})$, wherein $ID_{rec}$ comprises the identity of the recipient and wherein $H_1$ is a function capable of generating an element of the first cyclic group $G_1$ from a string of binary digits;

selecting a random key generation secret r; and encrypting the digital message M to form a ciphertext C, wherein C is set to be:

$C=[rP, M \oplus H_2(g^r)]$, where $g=ê(Q, P_B)ê(PK_B, P'_B) \in G_2$, where $PK_B$ is the recipient public key RPUB and wherein ê is a bilinear non-degenerate pairing which maps $G_1 \times G_1$ into $G_2$.

14. The method of claim 1, wherein the recipient encryption key RENC is generated from a document and the recipient decryption key RDEC is the authorizer's signature on the document.

15. A method for operating a public-key encryption scheme which provides for sending a digital message M between a sender and a recipient with participation of an authorizer, wherein the digital message is encrypted by the sender and decrypted by the recipient, the method comprising encrypting, by at least one machine in a set of one or more machines, the digital message M using at least a recipient public key RPUB and a recipient encryption key RENC to create an encrypted digital message for decryption with a recipient private key RPRIV and a recipient decryption key RDEC, wherein:

the recipient public key RPUB and the recipient private key RPRIV form a public key/private key pair 1, wherein the recipient private key RPRIV is a secret of the recipient;

the recipient decryption key RDEC is generated using at least a key generation secret of the authorizer and the recipient encryption key RENC, wherein a key formed from the recipient encryption key RENC and a key formed from the recipient decryption key RDEC are a public key/private key pair 2;

wherein the recipient decryption key RDEC is generated by the authorizer to have a value $S = s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q = s_c P$;

a second function $H_2$ capable of generating a second string of binary digits from an element of the second cyclic group $G_2$;

wherein both the first group $G_1$ and the second group $G_2$ are of the same prime order q;

wherein encrypting the digital message M comprises:

generating an element $P'_B = H_{1'}(ID_{rec})$, wherein $H_{1'}$ is a function capable of generating an element of the first cyclic group $G_1$ from a string of binary digits;

choosing a random parameter $\sigma \in \{0,1\}^n$;

set a random key generation secret $r = H_3(\sigma, M)$; and encrypting the digital message M to form a ciphertext C, wherein C is set to be:

$C = [rP, M \oplus H_2(g^r), E_{H_4(\sigma)}(M)]$, where $g = \hat{e}(Q, P_B)\hat{e}(PK_B, P'_B) \in G_2$, wherein $PK_B$ is the recipient public key RPUB, wherein $H_3$ is a function capable of generating an integer of the cyclic group Z/qZ from two strings of binary digits, $H_4$ is a function capable of generating one binary string from another binary string, E is a symmetric encryption scheme, ê is a bilinear non-degenerate pairing which maps $G_1 \times G_1$ into $G_2$, and $H_4(\sigma)$ is the key used with E.

16. The method of claim 1, wherein the method further comprises the recipient performing, by at least one machine in the set of the one or more machines, operations of:

generating the recipient public key RPUB and the recipient private key RPRIV;

decrypting the encrypted digital message using at least the recipient private key RPRIV and the recipient decryption key RDEC.

17. The method of claim 1 wherein the method further comprises the authorizer selecting, by at least one machine in the set of the one or more machines, said key generation secret and generating the recipient decryption key RDEC and sending the recipient decryption key to the recipient.

18. The method of claim 17 wherein the method further comprises the recipient performing, by at least one machine in the set of the one or more machines, operations of:

generating the recipient public key RPUB and the recipient private key RPRIV;

decrypting the encrypted digital message using at least the recipient private key RPRIV and the recipient decryption key RDEC.

19. The method of claim 1 further comprising generating, by at least one machine in the set of the one or more machines, the recipient encryption key RENC by the authorizer and/or the recipient and/or the sender.

20. The method of claim 2 further comprising generating, by at least one machine in the set of the one or more machines, the recipient encryption key RENC.

21. The method of claim 3 further comprising generating, by at least one machine in the set of the one or more machines, the recipient encryption key RENC.

22. The method of claim 4 further comprising generating, by at least one machine in the set of the one or more machines, the recipient encryption key RENC.

23. The method of claim 5 further comprising generating, by at least one machine in the set of the one or more machines, the recipient encryption key RENC.

24. The method of claim 6 wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

25. The method of claim 7 further comprising generating, by at least one machine in the set of the one or more machines, the recipient encryption key RENC.

26. The method of claim 4 wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

27. The method of claim 13 wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

28. The method of claim 9, wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

29. The method of claim 10, wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

30. The method of claim 11 wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

31. The method of claim 15 wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

32. The method of claim 14, wherein the method further comprises the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

33. The method of claim 14, wherein the method further comprises the recipient performing, by at least one machine in the set of the one or more machines, operations of:
   generating the recipient public key RPUB and the recipient private key RPRIV;
   decrypting the encrypted digital message using at least the recipient private key RPRIV and the recipient decryption key RDEC.

34. The method of claim 13, wherein the method further comprises the recipient performing, by at least one machine in the set of the one or more machines, operations of,
   generating the recipient public key RPUB and the recipient private key RPRIV; and
   decrypting the encrypted digital message to recover the digital message using at least the recipient private key RPRIV and the recipient decryption key RDEC.

35. The method of claim 15 further comprising the recipient performing, by at least one machine in the set of the one or more machines, operations of,
   generating the recipient public key RPUB and the recipient private key RPRIV; and
   decrypting the encrypted digital message to recover the digital message using at least the recipient private key RPRIV and the recipient decryption key RDEC.

36. The method of claim 13, further comprising generating, by at least one machine in the set of the one or more machines, the recipient encryption key RENC.

37. The method of claim 14, If further comprising generating, by at least one machine in the set of the one or more machines, the recipient encryption key RENC.

38. The method of claim 15 further comprising generating, by at least one machine in the set of the one or more machines, the recipient encryption key RENC.

39. The method of claim 6 further comprising generating, by at least one machine in the set of the one or more machines, the recipient encryption key RENC.

40. The method of claim 8 further comprising generating, by at least one machine in the set of the one or more machines, the recipient encryption key RENC.

41. A computer-readable manufacture comprising a computer-readable computer program operable to cause a computer to perform the method of claim 1.

42. A computer-readable manufacture comprising a computer-readable computer program operable to cause a computer to perform the method of claim 5.

43. A computer-readable manufacture comprising a computer-readable computer program operable to cause a computer to perform the method of claim 9.

44. A computer-readable manufacture comprising a computer-readable computer program operable to cause a computer to perform the method of claim 11.

45. A computer-readable manufacture comprising a computer-readable computer program operable to cause a computer to perform the method of claim 13.

46. A computer-readable manufacture comprising a computer-readable computer program operable to cause a computer to perform the method of claim 14.

47. A computer-readable manufacture comprising a computer-readable computer program operable to cause a computer to perform the method of claim 15.

48. A computer-readable manufacture comprising a computer-readable computer program operable to cause a computer to perform the method of claim 27.

49. A computer-readable manufacture comprising a computer-readable computer program operable to cause a computer to perform the method of claim 35.

50. A computer-readable manufacture comprising a computer-readable computer program operable to cause a computer to perform the method of claim 36.

51. A computer-readable manufacture comprising a computer-readable computer program operable to cause a computer to perform the method of claim 16.

52. A computer-readable manufacture comprising a computer-readable computer program operable to cause a computer to perform the method of claim 17.

53. A computer-readable manufacture comprising a computer-readable computer program operable to cause a computer to perform the method of claim 18.

54. A computer-readable manufacture comprising a computer-readable computer program operable to cause a computer to perform the method of claim 19.

55. A computer-readable manufacture comprising a computer-readable computer program operable to cause a computer to perform the method of claim 22.

56. A computer-readable manufacture comprising a computer-readable computer program operable to cause a computer to perform the method of claim 25.

57. A computer-readable manufacture comprising a computer-readable computer program operable to cause a computer to perform the method of claim 31.

58. A computer-readable manufacture comprising a computer-readable computer program operable to cause a computer to perform the method of claim 33.

59. A computer-readable manufacture comprising a computer-readable computer program operable to cause a computer to perform the method of claim 34.

60. A computer-readable manufacture comprising a computer-readable computer program operable to cause a computer to perform the method of claim 36.

61. A computer-readable manufacture comprising a computer-readable computer program operable to cause a computer to perform the method of claim 37.

62. A computer-readable manufacture comprising a computer-readable computer program operable to cause a computer to perform the method of claim 39.

63. A method for operating a public-key encryption scheme which provides for sending a digital message M between a sender and a recipient with participation of an authorizer, wherein the digital message M is encrypted by the sender using at least a recipient public key RPUB and a recipient encryption key RENC to create an encrypted digital message and is decrypted by the recipient, the method comprising decrypting, by at least one machine in a set of one or more machines, the encrypted digital message using at least a recipient private key RPRIV and a recipient decryption key RDEC, wherein:

the recipient public key RPUB and the recipient private key RPRIV form a public key/private key pair 1, wherein the recipient private key RPRIV is a secret of the recipient;

the recipient decryption key RDEC is generated using at least a key generation secret of the authorizer and the recipient encryption key RENC, wherein a key formed from the recipient encryption key RENC and a key formed from the recipient decryption key RDEC are a public key/private key pair 2;

wherein the recipient decryption key RDEC is generated by the authorizer to have a value $S=s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q=s_c P$;

a second function $H_2$ capable of generating a second string of binary digits from an element of the second cyclic group $G_2$, wherein $Inf_B$ comprises the identity of the recipient, $ID_{rec}$, the recipient public key RPUB, and a parameter defining a validity period for the recipient decryption key RDEC.

64. The method of claim 63, wherein the recipient encryption key RENC is generated from information comprising the identity of the recipient.

65. The method of claim 63, wherein the recipient encryption key RENC is generated from information comprising a parameter defining a validity period for the recipient decryption key RDEC.

66. The method of claim 63, wherein the recipient encryption key RENC is generated from information comprising the recipient public key RPUB.

67. The method of claim 63, wherein the recipient encryption key RENC is generated from information comprising the identity of the recipient, the recipient public key RPUB, and a parameter defining a validity period for the recipient decryption key RDEC.

68. The method of claim 63, wherein the recipient decryption key RDEC is generated by the authorizer according to a schedule known to the sender.

69. The method of claim 68, wherein the recipient encryption key RENC is generated using at least information comprising the schedule.

70. The method of claim 63, wherein the recipient private key RPRIV and the recipient public key RPUB are generated using at least one system parameter issued by the authorizer.

71. The method of claim 63, wherein both the first group $G_1$ and the second group $G_2$ are of the same prime order q.

72. The method of claim 63, wherein the first cyclic group $G_1$ is an additive group of points on a supersingular elliptic curve or abelian variety, and the second cyclic group $G_2$ is a multiplicative subgroup of a finite field.

73. The method of claim 63 wherein the system parameters available to the sender further comprise a function ê which is a bilinear, non-degenerate, and efficiently computable pairing which maps $G_1 \times G_1$ into $G_2$.

74. The method of claim 71 wherein:

$s_C$ is an element of the cyclic group Z/qZ.

75. A method for operating a public-key encryption scheme which provides for sending a digital message M between a sender and a recipient with participation of an authorizer, wherein the digital message M is encrypted by the sender using at least a recipient public key RPUB and a recipient encryption key RENC to create an encrypted digital message and is decrypted by the recipient, the method comprising decrypting, by at least one machine in a set of one or more machines, the encrypted digital message using at least a recipient private key RPRIV and a recipient decryption key RDEC, wherein:

the recipient public key RPUB and the recipient private key RPRIV form a public key/private key pair 1, wherein the recipient private key RPRIV is a secret of the recipient;

the recipient decryption key RDEC is generated using at least a key generation secret of the authorizer and the recipient encryption key RENC, wherein a key formed from the recipient encryption key RENC and a key formed from the recipient decryption key RDEC are a public key/private key pair 2;

wherein the recipient decryption key RDEC is generated by the authorizer to have a value $S=s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q=s_c P$;

a second function $H_2$ capable of generating a second string of binary digits from an element of the second cyclic group $G_2$;

wherein encrypting the digital message M comprises:

generating an element $P'_B = H_{1'}(ID_{rec})$, wherein $ID_{rec}$ comprises the identity of the recipient and wherein $H_{1'}$ is a function capable of generating an element of the first cyclic group $G_1$ from a string of binary digits;

selecting a random key generation secret r; and encrypting the digital message M to form a ciphertext C, wherein C is set to be:

$C=[rP, M \oplus H_2(g^r)]$, where $g=\hat{e}(Q, P_B)\hat{e}(PK_B, P'_B) \in G_2$, where $PK_B$ is the recipient public key RPUB and wherein ê is a bilinear non-degenerate pairing which maps $G_1 \times G_1$ into $G_2$.

76. The method of claim 63, wherein the recipient encryption key RENC is generated from a document and the recipient decryption key RDEC is the authorizer's signature on the document.

77. A method for operating a public-key encryption scheme which provides for sending a digital message M between a sender and a recipient with participation of an authorizer, wherein the digital message M is encrypted by the sender using at least a recipient public key RPUB and a recipient encryption key RENC to create an encrypted digital message and is decrypted by the recipient, the method comprising decrypting, by at least one machine in a set of one or more machines, the encrypted digital message using at least a recipient private key RPRIV and a recipient decryption key RDEC, wherein:

the recipient public key RPUB and the recipient private key RPRIV form a public key/private key pair 1, wherein the recipient private key RPRIV is a secret of the recipient;

the recipient decryption key RDEC is generated using at least a key generation secret of the authorizer and the recipient encryption key RENC, wherein a key formed from the recipient encryption key RENC and a key formed from the recipient decryption key RDEC are a public key/private key pair 2;

wherein the recipient decryption key RDEC is generated by the authorizer to have a value $S=s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q=s_c P$;

a second function $H_2$ capable of generating a second string of binary digits from an element of the second cyclic group $G_2$;

wherein both the first group $G_1$ and the second group $G_2$, are of the same prime order q;

wherein encrypting the digital message M comprises:

generating an element $P'_B=H_{1'}(ID_{rec})$ wherein $H_{1'}$ is a function capable of generating an element of the first cyclic group $G_1$ from a string of binary digits;

choosing a random parameter $\sigma \in \{0,1\}^n$;

set a random key generation secret $r=H_3(\sigma, M)$; and encrypting the digital message M to form a ciphertext C, wherein C is set to be:

$C=[rP, M \oplus H_2(g^r), E_{H_4(\sigma)}(M)]$, where $g=\hat{e}(Q, P_B)\hat{e}(PK_B, P'_B) \in G_2$, wherein $PK_B$ is the recipient public key RPUB, wherein $H_3$ is a function capable of generating an integer of the cyclic group $Z/qZ$ from two strings of binary digits, $H_4$ is a function capable of generating one binary string from another binary string, E is a symmetric encryption scheme, $\hat{e}$ is a bilinear non-degenerate pairing which maps $G_1 \times G_1$ into $G_2$, and $H_4(\sigma)$ is the key used with E.

78. The method of claim 63 further comprising the authorizer selecting, by at least one machine in the set of the one or more machines, said key generation secret and generating, by at least one machine in the set of the one or more machines, the recipient decryption key RDEC and sending, by at least one machine in the set of the one or more machines, the recipient decryption key RDEC to the recipient.

79. A computer-readable manufacture comprising a computer-readable computer program operable to cause a computer to perform the method of claim 63.

80. A method for operating a public-key encryption scheme which provides for sending a digital message M between a sender and a recipient with participation of an authorizer, wherein the digital message is encrypted by the sender using at least a recipient public key RPUB and a recipient encryption key RENC, wherein the recipient public key RPUB and a recipient private key RPRIV form a recipient public key!recipient private key pair, wherein the recipient private key RPRIV is a secret of the recipient, and the digital message is decrypted by the recipient using at least the recipient private key RPRIV and a recipient decryption key RDEC, the method comprising the authorizer performing, by at least one machine in a set of one or more machines, operations of:

selecting a key generation secret that is a secret of the authorizer;

generating the recipient decryption key RDEC using at least the key generation secret of the authorizer and the recipient encryption key RENC, wherein a key formed from the recipient encryption key RENC and a key formed from the recipient decryption key RDEC are a public key!private key pair;

sending the recipient decryption key RDEC to the recipient;

wherein the recipient decryption key RDEC is generated by the authorizer to have a value $S=s_c P_B$, wherein:

$s_c$ is the key generation secret of the authorizer; and $P_B$ is the recipient encryption key RENC and is equal to $H_1(Inf_B)$, wherein $Inf_B$ is an element of a first cyclic group $G_1$ of elements, wherein $P_B$ is an element of a second cyclic group $G_2$ of elements, and $H_1$ is a predefined function ("first function $H_1$"), wherein the first and second cyclic groups $G_1$ and $G_2$ and the function $H_1$ are system parameters made available to the sender, and also available to the sender are system parameters comprising:

a generator P of the first cyclic group $G_1$;

a key generation parameter $Q=s_c P$;

a second function $H_2$ capable of generating a second string of binary digits from an element of the second cyclic group $G_2$;

wherein $Inf_B$ comprises the identity of the recipient, $ID_{rec}$, the recipient public key RPUB, and a parameter defining a validity period for the recipient decryption key RDEC.

81. The method of claim 80, wherein the recipient encryption key RENC is generated from information comprising the identity of the recipient.

82. The method of claim 80, wherein the recipient encryption key RENC is generated from information comprising a parameter defining a validity period for the recipient decryption key RDEC.

83. The method of claim 80, wherein the recipient encryption key RENC is generated from information comprising the recipient public key RPUB.

84. The method of claim 80, wherein the recipient encryption key RENC is generated from information comprising the identity of the recipient, the recipient public key RPUB, and a parameter defining a validity period for the recipient decryption key RDEC.

85. The method of claim 80, wherein the recipient decryption key RDEC is generated by the authorizer according to a schedule known to the sender.

86. The method of claim 85, wherein the recipient encryption key RENC is generated using at least information comprising the schedule.

87. The method of claim 80, wherein both the first group $G_1$ and the second group $G_2$ are of the same prime order q.

88. The method of claim 80 wherein the first cyclic group $G_1$ is an additive group of points on a supersingular elliptic curve or abelian variety, and the second cyclic group $G_2$ is a multiplicative subgroup of a finite field.

89. The method of claim 80 wherein the system parameters available to the sender further comprise a function ê which is a bilinear, non-degenerate, and efficiently computable pairing which maps $G_1 \times G_1$ into $G_2$.

90. The method of claim 87 wherein:

$s_c$ is an element of the cyclic group Z/qZ.

91. The method of claim 80, wherein the recipient encryption key RENC is generated from a document and the recipient decryption key RDEC is the authorizer's signature on the document.

92. A computer-readable manufacture comprising a computer-readable computer program operable to cause a computer to perform the method of claim 80.

93. A computer-readable manufacture comprising a computer-readable computer program operable to cause a computer to perform the method of claim 89.

94. A computer-readable manufacture comprising a computer-readable computer program operable to cause a computer to perform the method of claim 91.

95. A computer-readable manufacture comprising a computer-readable computer program operable to cause a computer to perform the method of claim 75.

96. A computer-readable manufacture comprising a computer-readable computer program operable to cause a computer to perform the method of claim 77.

97. A computer-readable manufacture comprising a computer-readable computer program operable to cause a computer to perform the method of claim 64.

98. A computer-readable manufacture comprising a computer-readable computer program operable to cause a computer to perform the method of claim 81.

99. A computer-readable manufacture comprising a computer-readable computer program operable to cause a computer to perform the method of claim 82.

100. A computer-readable manufacture comprising a computer-readable computer program operable to cause a computer to perform the method of claim 83.

* * * * *

UNITED STATES PATENT AND TRADEMARK OFFICE
CERTIFICATE OF CORRECTION

| | | |
|---|---|---|
| PATENT NO. | : 7,657,748 B2 | Page 1 of 2 |
| APPLICATION NO. | : 10/521741 | |
| DATED | : February 2, 2010 | |
| INVENTOR(S) | : Craig B. Gentry | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1404 days.

Column 8, Line 34: delete "(PKB, SKB)"; insert --($PK_B$, $SK_B$)--.

Column 8, Line 44: delete the word "params"; insert --*params*--.

Column 8, Line 45: delete the words "masks S"; insert --masks *s*--.

Column 8, Line 46: delete the word "ID"; insert --*ID*--.

Column 8, Line 50 & 51: delete the words "s, params and ID"; insert --*s, params* and *ID*--.

Column 8, Line 52: delete the word "ID"; insert --*ID*--.

Column 8, Line 54: delete the words "params, ID and M"; insert --*params, ID* and *M*--.

Column 8, Line 55: delete the words "C to recover M"; insert --*C* to recover *M*--.

Column 10, Line 61 & 62: delete "$ê(P, P)^{abc}$ if P, aP, bP, and cP are known, but a, b, and c are not"; insert --$\hat{e}(P,P)^{abc}$ if *P, aP, bP*, and *cP* are known, but *a, b*, and *c* are not--.

Column 10, Line 64 & 65: delete "$ê(P, P)^{abc} = ê(abP, cP)$"; insert --$\hat{e}(P, P)^{abc} = \hat{e}(abP, cP)$--.

Column 10, Line 66 & 67: delete "$g=ê(P, P)$, then $g^{abc}=g^{ab})^c$ where $g^{ab}=ê(aP, bP)$ and $g^c=ê(P, cP)$";
insert --$g=\hat{e}(P, P)$, then $g^{abc}=(g^{ab})^c$ where $g^{ab}=\hat{e}(aP, bP)$ and $g^c=\hat{e}(P,cP)$--.

Signed and Sealed this

Twenty-first Day of December, 2010

David J. Kappos
*Director of the United States Patent and Trademark Office*

Column 11, Line 48: delete "$C = [rP, M \oplus H_2(g^r)]$, where $g=\hat{e}(Q, P_B) \in G_2$";
insert --$C = [rP, M \oplus H_2(g^r)]$, where $g = \hat{e}(Q, P_B)\hat{e}(s_B P, P'_B) \in G_2$--.

Column 12, Line 59: delete the word "params"; insert --*params*--.

Column 13, Line 39: delete the word "params"; insert --*params*--.

Column 13, Line 43: delete the word "Musing"; insert --*M* using--.

Column 15, Line 7: delete the word "sendery"; insert --sender *y*--.

Column 15, Line 11: delete the word "sendery"; insert --sender *y*--.

Column 15, Line 60: delete "m-1+1"; insert --*m-l*+1--.

Column 15, Line 66: delete "1-1"; insert --*l*-1--.

Column 16, Line 10: delete "n-1+1"; insert --*n-l*+1--.

Column 16, Line 17: delete "1-1"; insert --*l*-1--.

Column 16, Line 25: delete "n-1"; insert --*n-l*--.

Column 19, Line 37: delete "sendery"; insert --sender *y*--.

Column 20, Line 19: delete "$U_1 = rP_{zi}$ for $k+1 \leq I \leq n+1$"; insert --$U_i = rP_{zi}$ for $l+1 \leq i \leq n+1$--.

Column 24, Line 40: delete the word "params"; insert --*params*--.

Claim 80 line 8 (Column 38, Line 11): delete "key!recipient"; insert --key/recipient--.

Claim 80 line 21 (Column 38, Line 24): delete "key!private"; insert --key/private--.